(12) United States Patent
Davis et al.

(10) Patent No.: US 7,514,147 B2
(45) Date of Patent: Apr. 7, 2009

(54) FORMABLE THERMOPLASTIC MULTI-LAYER LAMINATE, A FORMED MULTI-LAYER LAMINATE, AN ARTICLE, AND A METHOD OF MAKING AN ARTICLE

(75) Inventors: Michael Shoen Davis, Mt. Vernon, IN (US); Martin Lindway, Waxhaw, NC (US); Michael T. Roland, Evansville, IN (US); Joseph Anthony Suriano, Clifton Park, NY (US); Hua Wang, Clifton Park, NY (US); Vicki Herzl Watkins, Alplaus, NY (US); Georgios S. Zafiris, Evansville, IN (US); Hongyi Zhou, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 392 days.

(21) Appl. No.: 10/748,941

(22) Filed: Dec. 30, 2003

(65) Prior Publication Data
US 2004/0175593 A1 Sep. 9, 2004

Related U.S. Application Data

(63) Continuation-in-part of application No. 10/310,295, filed on Dec. 5, 2002, now Pat. No. 6,689,474, which is a continuation-in-part of application No. 09/908,396, filed on Jul. 18, 2001, now Pat. No. 6,610,409, which is a continuation-in-part of application No. 09/368,706, filed on Aug. 5, 1999, now Pat. No. 6,306,507.

(60) Provisional application No. 60/134,692, filed on May 18, 1999.

(51) Int. Cl.
*B32B 27/08* (2006.01)
*B32B 27/30* (2006.01)
*B32B 27/32* (2006.01)
*B32B 27/36* (2006.01)

(52) U.S. Cl. .......... 428/412; 428/332; 428/339; 428/480; 428/483; 525/63; 525/64; 525/69

(58) Field of Classification Search .......... None
See application file for complete search history.

(56) References Cited

U.S. PATENT DOCUMENTS 3,030,331 A 4/1962 Goldberg (Continued)

FOREIGN PATENT DOCUMENTS

AT 410 578 B 10/2001

(Continued)

OTHER PUBLICATIONS

DE 101 00 745 A1, Aug. 16, 2001, Machine Translation; 7 pages.
DE 101 00 745 A1; Aug. 16, 2001, Abstract only, one page.

(Continued)

*Primary Examiner*—Vivian Chen
(74) *Attorney, Agent, or Firm*—Cantor Colburn LLP

(57) ABSTRACT

Disclosed is a formable thermoplastic multi-layer laminate comprising an outer layer comprising a polymer comprising resorcinol arylate polyester chain members, a middle layer comprising a thermoplastic polymer, an inner-tie layer comprising a thermoplastic polymer comprising a carbonate polymer and an acrylonitrile-styrene graft copolymer comprising at least one of an acrylonitrile-styrene-acrylate graft copolymer (ASA) or an acrylonitrile-butadiene-styrene graft copolymer (ABS), the middle layer being between the outer layer and the inner-tie layer and being in contact with both the outer layer and the inner-tie layer. Also disclosed are a formed multi-layer laminate and an article comprising the multi-layer laminate bonded to a substrate. A method of making the article is also disclosed.

4 Claims, 4 Drawing Sheets

U.S. PATENT DOCUMENTS

| | | |
|---|---|---|
| 3,169,121 A | 2/1965 | Goldberg |
| 3,207,814 A | 9/1965 | Goldberg |
| 3,309,261 A | 3/1967 | Schiller et al. |
| 3,391,054 A | 7/1968 | Lewis et al. |
| 3,444,129 A | 5/1969 | Young, Jr. et al. |
| 3,460,961 A | 8/1969 | Young, Jr. et al. |
| 3,492,261 A | 1/1970 | Young, Jr. et al. |
| 3,503,779 A | 3/1970 | Young, Jr. et al. |
| 3,505,160 A | 4/1970 | Michaels et al. |
| 3,764,457 A | 10/1973 | Chang et al. |
| 3,791,914 A | 2/1974 | Ammons et al. |
| 3,806,486 A | 4/1974 | Endriss et al. |
| 3,965,057 A | 6/1976 | Ammons et al. |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,381,259 A * | 4/1983 | Homma et al. ............ 510/122 |
| 4,381,359 A * | 4/1983 | Idel et al. .................. 524/117 |
| 4,438,229 A * | 3/1984 | Fujimori et al. ........... 524/109 |
| 4,444,950 A * | 4/1984 | Sakano et al. ............... 525/67 |
| 4,487,896 A | 12/1984 | Mark et al. |
| 4,490,506 A * | 12/1984 | Sakano et al. ............... 525/67 |
| 4,503,121 A | 3/1985 | Robeson et al. |
| 4,506,065 A | 3/1985 | Miller et al. |
| 4,564,654 A * | 1/1986 | Serini et al. ................. 525/67 |
| 4,576,842 A | 3/1986 | Hartsing et al. |
| 4,643,937 A | 2/1987 | Dickinson et al. |
| 4,695,239 A | 9/1987 | Klepsch et al. ............. 425/194 |
| 4,731,213 A * | 3/1988 | Klepsch ...................... 264/512 |
| 4,804,566 A * | 2/1989 | Paul et al. .................. 428/35.7 |
| 4,895,897 A * | 1/1990 | Kaufman .................... 525/67 |
| 4,931,364 A | 6/1990 | Dickinson |
| 4,992,322 A | 2/1991 | Curry et al. |
| 5,001,000 A | 3/1991 | Rohrbacher et al. |
| 5,001,193 A | 3/1991 | Golden |
| 5,030,505 A | 7/1991 | Dickinson |
| 5,080,950 A * | 1/1992 | Burke ............................ 428/81 |
| 5,185,116 A * | 2/1993 | Stewart ................... 264/178 F |
| 5,308,894 A * | 5/1994 | Laughner .................... 523/436 |
| 5,369,154 A * | 11/1994 | Laughner .................... 523/436 |
| 5,821,322 A | 10/1998 | Brunelle et al. |
| 6,136,441 A * | 10/2000 | MacGregor et al. ........ 428/412 |
| 6,174,959 B1 | 1/2001 | Ciebien et al. |
| 6,180,195 B1 | 1/2001 | Ellison et al. |
| 6,265,522 B1 * | 7/2001 | Brunelle et al. ............. 528/194 |
| 6,306,507 B1 * | 10/2001 | Brunelle et al. ........... 428/423.7 |
| 6,515,081 B2 | 2/2003 | Oosedo et al. ............... 525/531 |
| 6,538,065 B1 * | 3/2003 | Suriano et al. .............. 525/182 |
| 6,556,798 B2 | 4/2003 | Rimai et al. ................. 399/167 |
| 6,559,270 B1 * | 5/2003 | Siclovan et al. ............ 528/196 |
| 6,572,956 B1 | 6/2003 | Pickett et al. |
| 6,583,256 B2 * | 6/2003 | Vollenberg et al. ......... 528/196 |
| 6,589,378 B2 * | 7/2003 | Grefenstein et al. ........ 156/222 |
| 6,617,398 B2 | 9/2003 | Yeager et al. |
| 6,720,386 B2 * | 4/2004 | Gaggar et al. ................ 525/85 |
| 6,780,917 B2 * | 8/2004 | Hashimoto et al. ......... 524/456 |
| 6,890,979 B2 * | 5/2005 | Eichenauer et al. ........ 524/115 |
| 6,900,769 B2 * | 5/2005 | Schlieber et al. ............ 343/713 |
| 2001/0016626 A1 * | 8/2001 | Vollenberg et al. .......... 525/165 |
| 2002/0114650 A1 | 8/2002 | May et al. .................... 399/302 |
| 2002/0177551 A1 | 11/2002 | Terman ........................ 514/12 |
| 2002/0197438 A1 | 12/2002 | Hay et al. ................... 428/64.4 |
| 2003/0008164 A1 | 1/2003 | Klepsch ....................... 428/520 |
| 2003/0162895 A1 * | 8/2003 | Gaggar et al. ................. 525/70 |
| 2003/0175488 A1 * | 9/2003 | Asthana et al. .............. 428/212 |
| 2003/0207123 A1 * | 11/2003 | Brunelle et al. ........... 428/423.7 |
| 2003/0216539 A1 * | 11/2003 | Siclovan et al. ............. 528/272 |
| 2004/0028907 A1 | 2/2004 | Wang |
| 2004/0142176 A1 * | 7/2004 | Wang .......................... 428/412 |
| 2004/0166323 A1 | 8/2004 | Wang |
| 2004/0253428 A1 | 12/2004 | Wang et al. |
| 2005/0158554 A1 * | 7/2005 | Wang et al. ................. 428/412 |
| 2005/0158561 A1 | 7/2005 | Wang et al. |
| 2006/0017193 A1 * | 1/2006 | Asthana et al. .......... 264/173.1 |
| 2006/0019099 A1 * | 1/2006 | Wang et al. ................. 428/412 |

FOREIGN PATENT DOCUMENTS

| | | |
|---|---|---|
| DE | 101 00 745 A1 | 8/2001 |
| EP | 0225500 A2 | 11/1986 |
| EP | 244857 * | 11/1987 |
| EP | 326979 * | 8/1989 |
| EP | 0225500 B1 | 6/1990 |
| EP | 0 347 794 B1 | 7/1994 |
| EP | 0947562 A1 | 10/1998 |
| EP | 1 316 419 A2 * | 6/2003 |
| EP | 1 124 878 B1 | 1/2004 |
| JP | 50-046764 * | 4/1975 |
| JP | 1 199841 | 8/1989 |
| WO | WO 82/01098 | 4/1982 |
| WO | WO 88/10188 | 12/1988 |
| WO | WO 96/07541 | 3/1996 |
| WO | WO 96/11983 | 4/1996 |
| WO | WO 99/02339 | 1/1999 |
| WO | WO 00/26274 | 5/2000 |
| WO | WO 00/61644 | 10/2000 |
| WO | WO 00/61664 * | 10/2000 |
| WO | WO 00/69945 | 11/2000 |
| WO | WO 01/36535 A1 | 5/2001 |
| WO | WO 02/084129 A2 | 10/2002 |
| WO | WO 02/084129 A3 | 10/2002 |
| WO | WO 02/090109 A1 | 11/2002 |
| WO | WO 03/047857 A | 6/2003 |
| WO | WO 2004/085102 A2 | 10/2004 |

OTHER PUBLICATIONS

International Search Report; International Application No. US2004/000925; Applicant's File Reference 131713-2; International Filing Date Jan. 14, 2004; Date of Mailing Jun. 24, 2004.

Cohen, et al., Transparent Ultraviolet-Barrier Coatings; Journal of Polymer Science, Part A-1, vol. 9, pp. 3263-3299, 1971.

Lu, Qi-Wei, et al.; Compatibilized Blends of Thermoplastic Polyurethane (TPU) and Polypropylene; Macromol. Symp. 2003, 198, pp. 221-232.

JP1 199841; Mashiko, et al., Abstract only, one page, 1989.

* cited by examiner

FORMABLE THERMOPLASTIC MULTI-LAYER LAMINATE, A FORMED MULTI-LAYER LAMINATE, AN ARTICLE, AND A METHOD OF MAKING AN ARTICLE

CROSS REFERENCE TO RELATED APPLICATIONS

This application is a continuation-in-part of U.S. patent application Ser. No. 10/310,295, filed Dec. 5, 2002, U.S. Patent No. 6,689,474, which is a continuation-in-part of U.S. patent application Ser. No. 09/908,396, filed Jul. 18, 2001, U.S. Pat. No. 6,610,409, which is a continuation-in-part of U.S. patent application Ser. No. 09/368,706, filed Aug. 5, 1999, U.S. Pat. No. 6,306,507, which claims the benefits of U.S. Provisional Patent Application Ser. No. 60/134,692, filed May 18, 1999.

FIELD OF INVENTION

The present disclosure relates to a formable multi-layer thermoplastic laminate having good adhesion to substrates, especially foamed substrates.

BACKGROUND OF THE INVENTION

Many automobile components and vehicle body panels are molded of thermoformable compositions such as thermosetting polymer compositions. However, the automotive industry generally requires that all surfaces visible to the consumer have 'Class A' surface quality. At a minimum, such surfaces must be smooth, glossy, and weatherable. Components made of thermoformable compositions often require extensive surface preparation and the application of a curable coating to provide a surface of acceptable quality and appearance. The steps required to prepare such a surface may be expensive and time consuming and may affect the mechanical properties of the thermoset materials.

Although the as-molded surface quality of thermoformable components continues to improve, imperfections in their surfaces due to exposed glass fibers, glass fiber read-through, and the like often occur. These surface imperfections may further result in imperfections in coatings applied to such surfaces. Defects in the surface of thermoformable compositions and in cured coatings applied to the surfaces of thermoformable compositions may manifest as paint popping, long and short-term waviness, orange peel, variations in gloss or the like.

Several techniques have been proposed to provide thermoformable surfaces of acceptable appearance and quality. For example, overmolding of thin, preformed paint films may provide a desired Class A surface. However, such overmolding is usually applicable only for those compositions capable of providing virgin molded surfaces that do not require any secondary surface preparation operations. Although 'as-molded' surface quality has improved, as-molded surfaces of component parts continue to need sanding, especially at the edges, followed by sealing and priming prior to painting.

In-mold coating can obviate these operations, but only at the cost of greatly increased cycle time and cost. Such processes use expensive paint systems that may be applied to the part surface while the mold is re-opened slightly, and then closed to distribute and cure the coating.

Surface improvements have also been obtained by the addition of low profile additives. Such additives reduce the "read-through" at the surface by causing minute internal voids due to the high stresses and provide a smoother surface. If the void occurs at the surface however, a defect may result in the finish. The voids also act as stress concentrators, which may cause premature failures under additional stress or appear during the general sanding at the surface and leave a pit that the painting process cannot hide.

Thermoformable multi-layer laminates are known in the vehicular arts as providing acceptable surface preparation when applied to various automobile components without distorting the quality of the underlying surface or substrate. However, prior art laminates have known to show inter-layer or intra-layer separations, including separations from substrates bonded to the laminates. Moreover, the various layers of the multi-layer laminate compositions may adhere unevenly to each other and/or the surface or substrate to which they are applied. This can result in unacceptable surface qualities in the finished automotive part.

Multi-layer laminates have traditionally been formed in a variety of methods, including co-injecting molding, overmolding, multi-shot injection molding, sheet molding, co-extrusion, placement of a film of coating layer material on the surface of a substrate layer, and the like. Co-extrusion methods are especially desirable. Multi-layer laminates formed by co-extrusion are advantageous economically and generally exhibit improvements in cohesion and adhesion relative to the various layers making up the multi-layer laminate. However, some multi-layer laminate compositions are difficult to form by co-extrusion. Thus, it has been difficult to provide formable multi-layer laminates that have a desirable balance of properties with respect to adhesion to a substrate and surface quality but are also able to be co-extruded.

Therefore, there continues to be a need for a thermoformable multi-layer laminate composition that more effectively adheres to a substrate surface and provides desirable 'Class A' surface quality. Further, there is a need in the art for such thermoformable multi-layer laminate composition that can be made by co-extrusion processes.

SUMMARY OF INVENTION

The present disclosure is directed to a formable thermoplastic multi-layer laminate comprising an outer layer comprising a polymer comprising resorcinol arylate polyester chain members, a middle layer comprising a thermoplastic polymer, and an inner-tie layer comprising a thermoplastic polymer comprising a carbonate polymer and an acrylonitrile-styrene graft copolymer that is at least one of an acrylonitrile-styrene-acrylate graft copolymer (ASA) or an acrylonitrile-butadiene-styrene graft copolymer (ABS), the middle layer being between the outer layer and the inner-tie layer and being in contact with both the outer layer and the inner-tie layer.

In one embodiment, a formed multi-layer laminate is provided. Such formed multi-layer laminates may be made by a thermoforming method such as vacuum forming or by a method such as compression forming. In one exemplary embodiment, the formed multi-layer laminate is formed by thermoforming.

This disclosure is also directed to an article comprising the multi-layer laminate as described above, wherein the multi-layer laminate adheres to a substrate. In one embodiment, the substrate may be any of a variety of suitable materials including thermosetting materials, thermoplastic materials, foamed materials such as foamed polyurethane materials, and the like. The article is useful for preparing exterior automotive panels. In one embodiment, the multi-layer laminate bonded to a substrate will be a formed multi-layer laminate.

A process for making an article is also disclosed, comprising providing a multi-layer laminate comprising an outer layer comprising at least one sub-layer comprising resorcinol arylate polyester chain members, a middle layer comprising a thermoplastic polymer, and an inner-tie layer comprising a thermoplastic polymer comprising a carbonate polymer and an acrylonitrile-styrene graft copolymer that is at least one of an acrylonitrile-styrene-acrylate graft copolymer (ASA) or an acrylonitrile-butadiene-styrene graft copolymer (ABS), the middle layer being between the outer layer and the inner-tie layer and being in contact with both the outer layer and the inner-tie layer; placing the multi-layer laminate into a mold so that a cavity is formed behind the multi-layer laminate; and injecting a substrate into the cavity behind the multi-layer laminate wherein the inner-tie layer of the multi-layer laminate bonds to the substrate to provide an article. In another embodiment, the multi-layer laminate placed in the mold is a formed multi-layer laminate. In one exemplary embodiment, the mold comprises a shape or cavity that substantially conforms to the formed multi-layer laminate. In another embodiment, the method further comprises cooling the article, and removing the article from the mold.

DETAILED DESCRIPTION OF THE INVENTION

In one embodiment, a multi-layer laminate having improved adhesion to a substrate is disclosed. In another embodiment, a multi-layer laminate is disclosed that also provides a Class A surface, especially in a formed multi-layer laminate or in a formed article.

As used herein, the term "Class A surface" is given the general meaning known in the art and refers to a surface substantially free of visible defects such as hair-lines, pin-holes and the like. In one embodiment, a class A surface comprises a gloss of greater than 100 units at either 20 degrees or 60 degrees, a wavescan of less than 5 units (long as well as short), and a distinctness of image (DOI) of greater than 95 units. Upon application to a substrate, the multi-layer laminate maintains the surface quality of the substrate and provides an article having a desirable surface appearance and quality.

In one embodiment, the outer, middle, and inner-tie layers of the multi-layer laminate are comprised of thermally stable materials having viscosities and molecular weights such that the individual layers may be co-extruded into a thermoformable multi-layer laminate. Typically, compositions suitable for extrusion processing have higher weight average molecular weights, higher melt strength, and higher viscosity than compositions intended for processing via injection-molding equipment.

Figure 1:
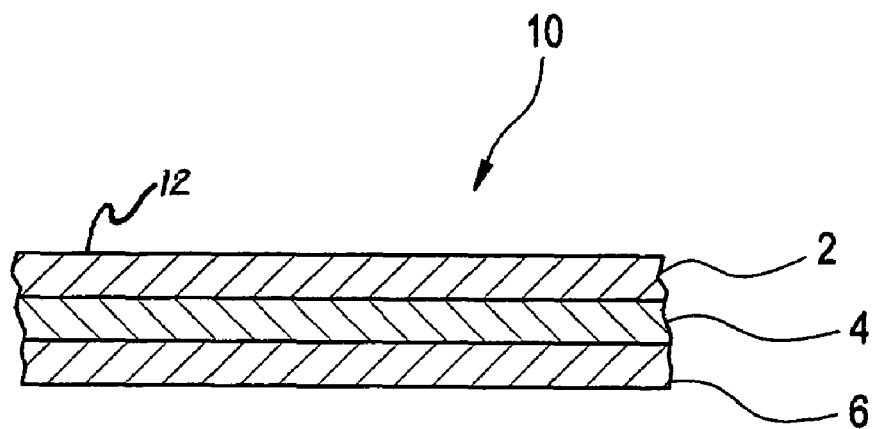
FIG. 1 is a cross-sectional view of one embodiment of the disclosed multi-layer laminate.

Turning now to FIG. 1, a sectional view of the disclosed multi-layer laminate 10 is shown. The multi-layer laminate 10 comprises an outer layer 2, an inner tie-layer 6 opposite to the outer layer 2 and a middle layer 4 disposed between the outer layer 2 and inner tie-layer 6.

In one exemplary embodiment, the outer layer 2 comprises a polymer comprising resorcinol polyester chain members, the middle layer 4 comprises a thermoplastic polymer comprising a carbonate polymer and the tie-layer 6 (also referred to herein as the "inner-tie layer") comprises a thermoplastic polymer comprising a carbonate polymer, an acrylonitrile-styrene graft copolymer that is at least one of an acrylonitrile-styrene-acrylate graft copolymer (ASA) or an acrylonitrile-butadiene-styrene graft copolymer (ABS).

In one embodiment, the outer layer 2 of the multi-layer laminate 10 will comprise at least one polymer comprising resorcinol arylate polyester chain members.

"Resorcinol arylate polyester chain members" as used herein refers to chain members that comprise at least one diphenol residue in combination with at least one aromatic diphenol residue in combination with at least one aromatic dicarboxylic acid residue. The preferred diphenol residue, illustrated in Formula I, is derived from a 1,3 dihydroxybenzene moiety, commonly referred to throughout this specification as resorcinol or resorcinol moiety. Resorcinol or resorcinol moiety as used herein should be understood to include both unsubstituted 1,3-dihydroxybenzene and substituted 1,3-dihydroxybenzene unless explicitly stated otherwise.

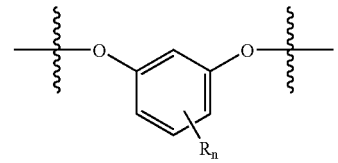

wherein R is at least one of C1-12 alkyl or halogen, and n is 0-3.

Suitable dicarboxylic acid residues include aromatic dicarboxylic acid residues derived from monocyclic moieties, preferably isophthalic acid, terephthalic acid, or mixtures thereof, or from polycyclic moieties, including diphenyl dicarbonxylic acid, diphenyl ether dicarboxylic acid, naphthalenedicarboxylic acid such as naphthalene-2,6-dicarboxylic acid, and morphthalene dicarboxylic acid such as morphthalene 2,6-dicarboxylic acid. In one embodiment, the dicarboxylic acid residue used will be 1,4-cyclohexanedicarboxylic acid residue.

In one exemplary embodiment, the aromatic dicarboxylic acid residues will be derived from mixtures of isophthalic and/or terephthalic acids as illustrated in Formula II.

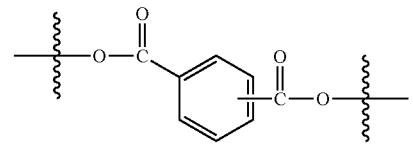

In one exemplary embodiment, the outer layer 2 will comprise a polymer as illustrated in Formula III wherein R and n are as previously defined:

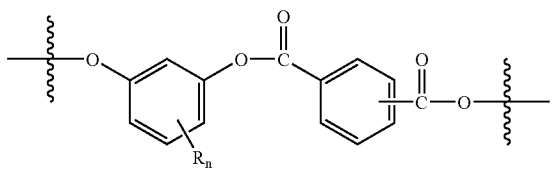

In one exemplary embodiment, the outer layer 2 will comprise a polymer having resorcinol arylate polyester chain members that are substantially free of anhydride linkages as are illustrated in Figure IV:

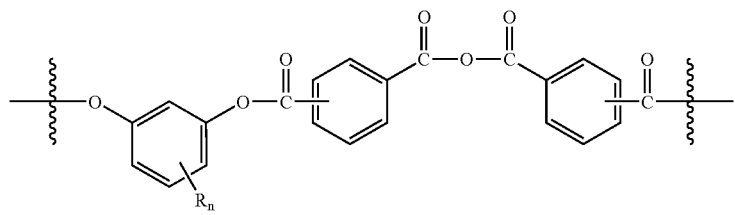

In one exemplary embodiment, outer layer 2 will comprise a polymer comprising resorcinol arylate polyester chain members made by an interfacial method comprising a first step of combining at least one resorcinol moiety and at least one catalyst in a mixture of water and at least one organic solvent substantially immiscible with water. Suitable resorcinol moieties comprise units of Formula V:

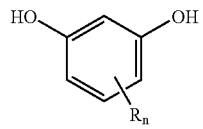

wherein R is at least one of $C_{1-12}$ alkyl or halogen, and n is 0-3. Alkyl groups, if present, are preferably straight-chain or branched alkyl groups, and are most often located in the ortho position to both oxygen atoms although other ring locations are contemplated. Suitable $C_{1-12}$ alkyl groups include methyl, ethyl, n-propyl, isopropyl, butyl, iso-butyl, t-butyl, nonyl, decyl, and aryl-substituted alkyl, including benzyl, with methyl being particularly preferred. Suitable halogen groups are bromo, chloro, and fluoro. The value for n may be 0-3, preferably 0-2, and more preferably 0-1. A preferred resorcinol moiety is 2-methylresorcinol. The most preferred resorcinol moiety is an unsubstituted resorcinol moiety in which n is zero.

In one exemplary embodiment, at least one catalyst will be combined with the reaction mixture used in the interfacial method of polymerization. Said catalyst may be present at a total level of 0.1 to 10 mole %, and preferably 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof Suitable tertiary amines include triethylamine, dimethylbutylamine, diisopropylethylamine, 2,2,6,6-tetramethylpiperidine, and mixtures thereof Other contemplated tertiary amines include N—C1-C6 -alkyl-pyrrolidines, such as N- ethylpyrrolidine, N—C1-C6-piperidines, such as N-ethylpiperidine, N-methylpiperidine, and N-isopropylpiperidine, N—C1-C6 -morpholines, such as N-ethylmorpholine and N-isopropyl-morpholine, N—C1-C6 - dihydroindoles, N—C1-C6 -dihydroisoindoles, N—C1-C6-tetrahydroquinolines, N—C1-C 6 -tetrahydroisoquinolines, N—C1-C6-benzomorpholines, 1-azabicyclo-[3.3.0]-octane, quinuclidine, N—C1-C6 -alkyl-2-azabicyclo-[2.2.1]-octanes, N—C1-C6-alkyl-2-azabicyclo-[3.3.1]-nonanes, and N—C1-C6-alkyl-3-azabicyclo-[3.3.1]-nonanes, N,N,N', N'-tetraalkylalkylene-diamines, including N,N,N',N'-tetraethyl-1,6- hexanediamine. Particularly preferred tertiary amines are triethylamine and N-ethylpiperidine.

When the catalyst consists of at least one tertiary amine alone, then said catalyst may be present at a total level of 0.1 to 10 mole %, preferably 0.2 to 6 mole %, more preferably 1 to 4 mole %, and most preferably 2.5 to 4 mole % based on total molar amount of acid chloride groups. In one embodiment of the invention all of the at least one tertiary amine is present at the beginning of the reaction before addition of dicarboxylic acid dichloride to resorcinol moiety. In another embodiment a portion of any tertiary amine is present at the beginning of the reaction and a portion is added following or during addition of dicarboxylic acid dichloride to resorcinol moiety. In this latter embodiment the amount of any tertiary amine initially present with resorcinol moiety may range from about 0.005 wt. % to about 10 wt. %, preferably from about 0.01 to about 1 wt. %, and more preferably from about 0.02 to about 0.3 wt. % based on total amine.

Suitable quaternary ammonium salts, quaternary phosphonium salts, and hexaalkylguanidinium salts include halide salts such as tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N- laurylpyridinium bromide, N-heptylpyridinium bromide, tiicaprylylmethylammonium chloride (sometimes known as ALIQUAT 336), methyltri-$C_8$-$C_{10}$-alkyl-ammonium chloride (sometimes known as ADOGEN 464), N,N,N',N',N'-pentaalkyl-alpha, omega-amineammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide, hexaalkylguanidinium halides, hexaethylguanidinium chloride, and the like, and mixtures thereof Organic solvents substantially immiscible with water include those that are less than about 5 wt. %, and preferably less than about 2 wt. % soluble in water under the reaction conditions. Suitable organic solvents include dichloromethane, trichloroethylene, tetrachloroethane, chloroform, 1,2-dichloroethane, toluene, xylene, trimethylbenzene, chlorobenzene, o- dichlorobenzene, and mixtures thereof. An especially preferred solvent is dichloromethane.

Suitable dicarboxylic acid dichlorides comprise aromatic dicarboxylic acid dichlorides derived from monocyclic moieties, preferably isophthaloyl dichloride, terephthaloyl dichloride, or mixtures of isophthaloyl and terephthaloyl dichlorides, or from polycyclic moieties, including diphenyl dicarboxylic acid dichloride, diphenylether dicarboxylic acid dichloride, and naphthalenedicarboxylic acid dichloride, preferably naphthalene-2,6-dicarboxylic acid dichloride; or from mixtures of monocyclic and polycyclic aromatic dicarboxylic acid dichlorides. Preferably, the dicarboxylic acid dichloride comprises mixtures of isophthaloyl and/or terephthaloyl dichlorides as typically illustrated in Formula VI.

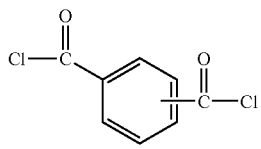

Either or both of isophthaloyl and terephthaloyl dichlorides may be used to make the polymer comprised in the outer layer 2. In one embodiment, the dicarboxylic acid dichlorides comprise mixtures of isophthaloyl and terephthaloyl dichloride in a molar ratio of isophthaloyl to terephthaloyl of about 0.25-4.0:1, in another embodiment, about 0.4-2.5:1, and in one exemplary embodiment, about 0.67-1.5:1.

The pH of the interfacial reaction mixture is maintained between about 3 and about 8.5 in one embodiment, and between about 5 and about 8 in another embodiment, throughout addition of the at least one dicarboxylic acid dichloride to the at least one resorcinol moiety. Suitable reagents to maintain the pH include alkali metal hydroxides, alkaline earth hydroxides, and alkaline earth oxides. Preferred reagents are potassium hydroxide and sodium hydroxide. A particularly preferred reagent is sodium hydroxide. The reagent to maintain pH may be included in the reaction mixture in any convenient form. In one embodiment, the reagent is added to the reaction mixture as an aqueous solution simultaneously with the at least one dicarboxylic acid dichloride.

The temperature of the interfacial reaction mixture may be any convenient temperature that provides a rapid reaction rate and a resorcinol arylate-containing polymer substantially free of anhydride linkages. Convenient temperatures include those from about −20° C. to the boiling point of the water-organic solvent mixture under the reaction conditions. In one embodiment, the reaction is performed at the boiling point of the organic solvent in the water-organic solvent mixture. In one exemplary embodiment the reaction is performed at the boiling point of dichloromethane.

The total molar amount of acid chloride groups added to the reaction mixture is stoichiometrically deficient relative to the total molar amount of phenolic groups. Said stoichiometric ratio is desirable so that hydrolysis of acid chloride groups is minimized, and so that nucleophiles such as phenolic and/or phenoxide may be present to destroy any adventitious anhydride linkages, should any form under the reaction conditions. The total molar amount of acid chloride groups includes the at least one dicarboxylic acid dichloride, and any mono-carboxylic acid chloride chain-stoppers and any tri- or tetra-carboxylic acid tri- or tetra-chloride branching agents which may be used. The total molar amount of phenolic groups includes resorcinol moieties, and any mono-phenolic chain-stoppers and any tri- or tetra-phenolic branching agents that may be used. The stoichiometric ratio of total phenolic groups to total acid chloride groups is preferably about 1.5-1.01:1 and more preferably about 1.2-1.02:1.

The presence or absence of anhydride linkages following complete addition of the at least one dicarboxylic acid dichloride to the at least one resorcinol moiety will typically depend upon the exact stoichiometric ratio of reactants and the amount of catalyst present, as well as other variables. For example, if a sufficient molar excess of total phenolic groups is present, anhydride linkages are often found to be absent. Often a molar excess of at least about 1%, and in one embodiment, at least about 3%, of total amount of phenolic groups over total amount of acid chloride groups may suffice to eliminate anhydride linkages under the reaction conditions. When anhydride linkages may be present, it is often desirable that the final pH be greater than 7 so that nucleophiles such as phenolic, phenoxide and/or hydroxide may be present to destroy any anhydride linkages. Therefore, in one embodiment, the interfacial method used to provide the polymer of the at least one sub-layer of the outer layer 2 may further comprise the step of adjusting the pH of the reaction mixture to between 7 and 12, in one embodiment, between 8 and 12, and in another embodiment, between 8.5 and 12, following complete addition of the at least one dicarboxylic acid dichloride to the at least one resorcinol moiety. The pH may be adjusted by any convenient method, preferably using an aqueous base such as aqueous sodium hydroxide.

Provided the final pH of the reaction mixture is greater than 7, the interfacial method used to provide the polymer comprised in outer layer 2 may further comprise the step of stirring the reaction mixture for a time sufficient to destroy completely any adventitious anhydride linkages, should any be present. The necessary stirring time will depend upon reactor configuration, stirrer geometry, stirring rate, temperature, total solvent volume, organic solvent volume, anhydride concentration, pH, and other factors. In some instances the necessary stirring time is essentially instantaneous, for example within seconds of pH adjustment to above 7, assuming any adventitious anhydride linkages were present to begin with. For typical laboratory scale reaction equipment a stirring time of at least about 3 minutes, and in one embodiment, at least about 5 minutes may be required. By this process nucleophiles, such as phenolic, phenoxide and/or hydroxide, may have time to destroy completely any anhydride linkages, should any be present.

At least one chain-stopper (also referred to sometimes hereinafter as capping agent) may also be used in the interfacial method used to make the polymer comprising resorcinol arylate polyester chain members. A purpose of adding at least one chain-stopper is to limit the molecular weight of polymer comprising resorcinol arylate polyester chain members, thus providing polymer with controlled molecular weight and favorable processability. Typically, the at least one chain-stopper is added when the resorcinol arylate-containing polymer is not required to have reactive end-groups for further application. In the absence of chain- stopper resorcinol arylate-containing polymer may be either used in solution or recovered from solution for subsequent use such as in copolymer formation which may require the presence of reactive end-groups, typically hydroxy, on the resorcinol-arylate polyester segments. A chain- stopper may be at least one of mono-phenolic compounds, mono-carboxylic acid chlorides, and/or mono-chloroformates. Typically, the at least one chain-stopper may be present in quantities of 0.05 to 10 mole %, based on resorcinol moieties in the case of mono-phenolic compounds and based on acid dichlorides in the case mono-carboxylic acid chlorides and/or mono-chloroformates.

Suitable mono-phenolic compounds include monocyclic phenols, such as phenol, $C_1$-$C_{22}$ alkyl-substituted phenols, p-cumyl-phenol, p-tertiary- butyl phenol, hydroxy diphenyl; monoethers of diphenols, such as p- methoxyphenol. Alkyl-substituted phenols include those with branched chain alkyl substituents having 8 to 9 carbon atoms, in one embodiment, in which about 47 to 89% of the hydrogen atoms are part of methyl groups. For some embodiments the use of a mono-phenolic UV screener as capping agent is preferred. Such compounds include 4-substituted-2-hydroxybenzophenones and their derivatives, aryl salicylates, monoesters of diphenols, such as resorcinol monobenzoate, 2- (2-hydroxyaryl)-benzotriazoles and their derivatives, 2-(2-hydroxyaryl)-1, 3,5-triazines and their derivatives, and like compounds. In one embodiment the mono-phenolic chain-stoppers will be at least one of phenol, p-cumylphenol, or resorcinol monobenzoate.

Suitable mono-carboxylic acid chlorides include monocyclic, mono-carboxylic acid chlorides, such as benzoyl chloride, $C_1$-$C_{22}$ alkyl- substituted benzoyl chloride, toluoyl chloride, halogen-substituted benzoyl chloride, bromobenzoyl chloride, cinnamoyl chloride, 4- nadimidobenzoyl chloride, and mixtures thereof, polycyclic, mono- carboxylic acid chlorides, such as trimellitic anhydride chloride, and naphthoyl chloride; and mixtures of monocyclic and polycyclic mono- carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloromates include monocyclic, mono-chloroformates, such as phenyl chloroformate, alkyl-substituted phenyl chloroformate, p-cumyl phenyl chloroformate, toluene chloroformate, and mixtures thereof.

A chain-stopper can be combined together with the resorcinol moieties, can be contained in the solution of dicarboxylic acid dichlorides, or can be added to the reaction mixture after production of a precondensate. If mono-carboxylic acid chlorides and/or mono-chloroformates are used as chain-stoppers, they are preferably introduced together with dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added to the reaction mixture during the reaction, or, more preferably, before the beginning of the reaction between resorcinol moiety and acid chloride moiety. When hydroxy- terminated resorcinol arylate-containing precondensate or oligomers are prepared, then chain-stopper may be absent or only present in small amounts to aid control of oligomer molecular weight.

In another embodiment the interfacial method used to provide the polymer comprising resorcinol arylate polyester chain members may encompass the inclusion of at least one branching agent such as a trifunctional or higher functional carboxylic acid chloride and/or trifunctional or higher functional phenol. Such branching agents, if included, can preferably be used in quantities of 0.005 to 1 mole %, based on dicarboxylic acid dichlorides or resorcinol moieties used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties whilst acid chloride branching agents may be introduced together with acid dichlorides.

In one exemplary embodiment, the polymer comprising the resorcinol arylate polyester chain members will be recovered from the interfacial reaction mixture by known recovery methods. Recovery methods may include such steps as acidification of the mixture, for example with phosphorous acid; subjecting the mixture to liquid-liquid phase separation; washing the organic phase with water and/or a dilute acid such as hydrochloric acid or phosphoric acid; precipitating by usual methods such as through treatment with water or anti-solvent precipitation with, for example, methanol, ethanol, and/or isopropanol; isolating the resulting precipitates; and drying to remove residual solvents.

If desired, the resorcinol arylate polymers used in the outer layer 2 may be made by the interfacial method further comprising the addition of a reducing agent. Suitable reducing agents include, for example, sodium sulfite, sodium gluconate, or a borohydride, such as sodium borohydride. When present, any reducing agents are typically used in quantities of from 0.25 to 2 mole %, based on moles of resorcinol moiety.

In one embodiment, the polymers comprising resorcinol arylate polyester chain members will be substantially free of anhydride linkages linking at least two mers of the polyester chain. In a particular embodiment said polyesters comprise dicarboxylic acid residues derived from a mixture of iso- and terephthalic acids as illustrated in Formula VII:

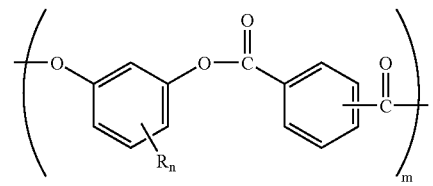

wherein R is at least one of $C_{1-12}$ alkyl or halogen, n is 0-3, and m is at least about 8. In one embodiment, n is zero and m is between about 10 and about 300. The molar ratio of isophthalate to terephthalate is about 0.25-4.0:1, in one embodiment about 0.4-2.5:1, and in another embodiment about 0.67-1.5:1. Substantially free of anhydride linkages means that said polyesters show decrease in molecular weight of less than 30% and preferably less than 10% upon heating said polymer at a temperature of about 280-290° C. for five minutes.

In one embodiment, the polymer comprising resorcinol arylate polyester chain members will comprise copolyesters comprising resorcinol arylate polyester chain members in combination with dicarboxylic acid or diol alkylene chain members (so-called "soft-block" segments), said copolyesters being substantially free of anhydride linkages in the polyester segments. Substantially free of anhydride linkages means that the copolyesters show decrease in molecular weight of less than 10% and preferably less than 5% upon heating said copolyester at a temperature of about 280-290° C. for five minutes.

The term soft-block as used herein indicates that some segments of the polymers are made from non-aromatic monomer units. Such non-aromatic monomer units are generally aliphatic and are known to impart flexibility to the soft-block-containing polymers. The copolymers include those comprising structural units of Formulas I, VIII, and IX:

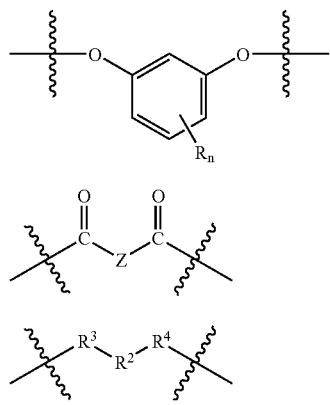

Formula I

Formula VIII

Formula IX wherein R and n are as previously defined, Z is a divalent aromatic radical, $R^2$ is a $C_{3-20}$ straight chain alkylene, $C_{3-10}$ branched alkylene, or $C_{4-10}$ cyclo- or bicycloalkylene group, and $R^3$ and $R^4$ each independently represent

or —$CH_2$—O—, wherein Formula IX contributes from about 1 to about 45 mole percent to the ester linkages of the polyester. In other embodiments, Formula IX may contribute from about 5 to about 40 mole percent to the ester linkages of the polyester, with about 5 to about 20 mole percent being particularly preferred. Another embodiment provides a composition wherein $R^2$ represents $C_{3-14}$ straight chain alkylene, or $C_{5-6}$ cycloalkylene, with a preferred composition being one wherein $R^2$ represents $C_{3-10}$ straight-chain alkylene or $C_6$-cycloalkylene. Formula VIII represents an aromatic dicarboxylic acid residue. The divalent aromatic radical Z in Formula VIII may be derived form at least one of the suitable dicarboxylic acid residues as defined hereinabove, and preferably at least one of 1,3-phenylene, 1,4-phenylene, or 2,6- naphthylene. In more preferred embodiments Z comprises at least about 40 mole percent 1,3-phenylene. In one exemplary embodiment, for copolyesters containing soft-block chain members, n in Formula I is zero.

In one embodiment, the outer layer 2 will comprise copolyesters containing resorcinol arylate chain members comprising from about 1 to about 45 mole % sebacate or cyclohexane 1,4-dicarboxylate units. In another embodiment, the copolyester containing resorcinol arylate chain members is one comprising resorcinol isophthalate and resorcinol sebacate units in molar ratio between 8.5:1.5 and 9.5:0.5. In one exemplary embodiment, the copolyester is prepared using sebacoyl chloride in combination with isophthaloyl dichloride.

In another embodiment, the polymer comprising the resorcinol arylate polyester chain members will comprise thermally stable block copolyester carbonates comprising resorcinol arylate-containing block segments in combination with organic carbonate block segments. The segments comprising resorcinol arylate chain members in such copolymers are substantially free of anhydride linkages. Substantially free of anhydride linkages means that the copolyester carbonates show decrease in molecular weight of less than 10% and preferably less than 5% upon heating said copolyester carbonate at a temperature of about 280-290° C. for five minutes.

The block copolyester carbonates include those comprising alternating arylate and organic carbonate blocks, typically as illustrated in Formula X, wherein R and n are as previously defined, and $R^5$ is at least one divalent organic radical:

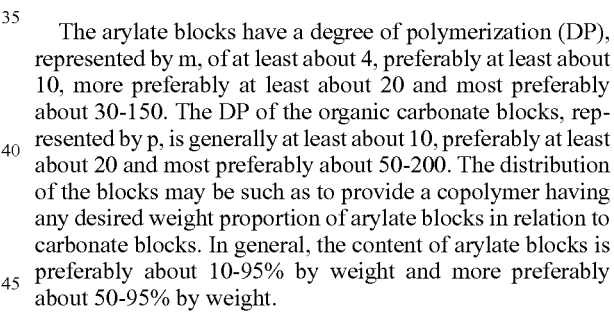

The arylate blocks have a degree of polymerization (DP), represented by m, of at least about 4, preferably at least about 10, more preferably at least about 20 and most preferably about 30-150. The DP of the organic carbonate blocks, represented by p, is generally at least about 10, preferably at least about 20 and most preferably about 50-200. The distribution of the blocks may be such as to provide a copolymer having any desired weight proportion of arylate blocks in relation to carbonate blocks. In general, the content of arylate blocks is preferably about 10-95% by weight and more preferably about 50-95% by weight.

Although a mixture of iso- and terephthalate is illustrated in Formula X, the dicarboxylic acid residues in the arylate blocks may be derived from any suitable dicarboxylic acid residue, as defined hereinabove, or mixture of suitable dicarboxylic acid residues, including those derived from aliphatic diacid dichlorides (so-called "soft-block" segments). In preferred embodiments n is zero and the arylate blocks comprise dicarboxylic acid residues derived from a mixture of iso- and terephthalic acid residues, wherein the molar ratio of isophthalate to terephthalate is about 0.25-4.0:1, preferably about 0.4-2.5:1, and more preferably about 0.67-1.5:1.

In the organic carbonate blocks, each $R^5$ is independently a divalent organic radical. Preferably, said radical comprises at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'- spirobi [1H-indan]) and similar radicals such as those which correspond to the dihydroxy-substituted aromatic hydrocarbons disclosed by name or formula (generic or specific) as described U.S. Pat. No. 4,217,438.

In one exemplary embodiment, each $R^5$ is an aromatic organic radical. and still more preferably a radical of Formula XI:

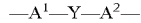

wherein each $A^1$ and $A^2$ is a monocyclic divalent aryl radical and Y is a bridging radical in which one or two carbon atoms separate $A^1$ and $A^2$. The free valence bonds in Formula XI are usually in the meta or para positions of $A^1$ and $A^2$ in relation to Y. Compounds in which $R^5$ has Formula XI are bisphenols, and for the sake of brevity the term "bisphenol" is sometimes used herein to designate the dihydroxy-substituted aromatic hydrocarbons. It should be understood, however, that non-bisphenol compounds of this type might also be employed as appropriate.

In Formula XI, $A^1$ and $A^2$ typically represent unsubstituted phenylene or substituted derivatives thereof, illustrative substituents (one or more) being alkyl, alkenyl, and halogen (particularly bromine). Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms separate $A^1$ from $A^2$. The preferred embodiment is one in which one atom separates $A^1$ from $A^2$. Illustrative radicals of this type are —O—, —S—, —SO— or —SO$_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals. Gem-alkylene (commonly known as "alkylidene") radicals are preferred. Also included, however, are unsaturated radicals. For reasons of availability and particular suitability for the purposes of this invention, the preferred bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^5$ in the carbonate blocks may at least partially comprise resorcinol moiety. In other words, in some embodiments, carbonate blocks of Formula X may comprise a resorcinol moiety in combination with at least one other dihydroxy-substituted aromatic hydrocarbon.

Polymers comprising resorcinol arylate polyester chain members further comprise diblock, triblock, and multiblock copolyestercarbonates. The chemical linkages between blocks comprising resorcinol arylate chain members and blocks comprising organic carbonate chain members may comprise at least one of (a) an ester linkage between a suitable dicarboxylic acid residue of an arylate moiety and an —O—$R^5$—O— moiety of an organic carbonate moiety, for example as typically illustrated in Formula XII, wherein R is as previously defined:

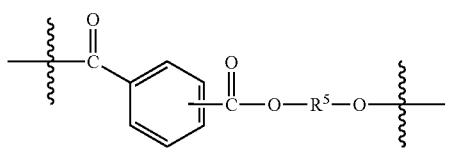

and (b) a carbonate linkage between a diphenol residue of a resorcinol arylate moiety and an organic carbonate moiety as shown in Formula XIII,

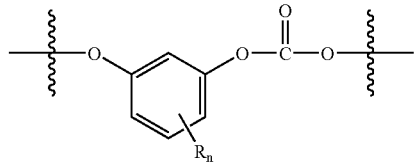

wherein R and n are as previously defined

The presence of a significant proportion of ester linkages of the type (a) may result in undesirable color formation in the copolyestercarbonates. Although the invention is not limited by theory, it is believed that color may arise, for example, when $R^5$ in Formula XII is bisphenol A and the moiety of Formula XII undergoes Fries rearrangement during subsequent processing and/or light-exposure. In one embodiment the copolyester carbonate is substantially comprised of a diblock copolymer with a carbonate linkage between resorcinol arylate block and an organic carbonate block. In a more preferred embodiment the copolyester carbonate is substantially comprised of a triblock carbonate-ester-carbonate copolymer with carbonate linkages between the resorcinol arylate block and organic carbonate end-blocks.

Copolyestercarbonates with at least one carbonate linkage between a thermally stable resorcinol arylate block and an organic carbonate block are typically prepared from resorcinol arylate-containing oligomers prepared by the method of the invention and containing at least one and preferably two hydroxy-terminal sites. Said oligomers typically have weight average molecular weight of about 10,000 to about 40,000, and more preferably about 15,000 to about 30,000. Thermally stable copolyestercarbonates may be prepared by reacting said resorcinol arylate- containing oligomers with phosgene, at least one chain-stopper, and at least one dihydroxy-substituted aromatic hydrocarbon in the presence of a catalyst such as a tertiary amine.

In one exemplary embodiment, the at least one polymer comprising resorcinol arylate polyester chain members comprises an iso terephthalic resorcinol (ITR)/bisphenol A copolymer.

In one embodiment, the outer layer 2 may comprise one or more sub-layers wherein at least one sub-layer comprises the polymer comprising resorcinol acrylate polyester chain members. In one embodiment, the outer layer 2 will consist solely of a single sub-layer comprising the polymer comprising resorcinol acrylate polyester chain members. In another embodiment, the outer layer 2 may comprise one or more additional sub-layers and in one exemplary embodiment, may comprise up to four additional sub-layers. For example, in one embodiment, a sub-layer may be a composition capable of adhering the outer layer 2 to the middle layer 4. Illustrative examples of suitable adhesive compositions include heat sensitive adhesives, pressure sensitive adhesives, and the like.

In one particularly exemplary embodiment the outer-most layer of the outer layer 2 will be at least one sub-layer comprising a polymer comprising resorcinol acrylate polyester chain members. As used herein "outer-most layer" refers to the sub-layer that forms an exterior surface 12 as illustrated in FIG. 1.

The outer layer 2 can comprise other components such art-recognized additives including, but not limited to, stabilizers, color stabilizers, heat stabilizers, light stabilizers, auxiliary UV screeners, auxiliary UV absorbers, flame retardants, anti-drip agents, flow aids, plasticizers, ester interchange inhibitors, antistatic agents, mold release agents, and colorants such as metal flakes, glass flakes and beads, ceramic particles, other polymer particles, dyes and pigments which may be organic, inorganic or organometallic.

In one embodiment, the total thickness of the outer layer 2 is about 3 to about 25 thousands of an inch (hereafter "mil"). In another embodiment, the outer layer 2 is about 3 to about 15 mils thick. In one exemplary embodiment, the thickness of the outer layer 2 is about 5 to about 15 mils.

In one exemplary embodiment, the middle layer 4 of the multi-layer laminate 10 comprises a thermoplastic polymer comprising a carbonate polymer and is disposed between the outer layer 2 and tie-layer 6. In one embodiment, the middle layer 4 is in contact with both the outer layer 2 and the inner-tie layer 6. In one exemplary embodiment, the middle layer 4 will be in continuous contact with the both the outer layer 2 and the inner-tie layer 6.

The thickness of the middle layer 4 may determined by the desired application. In one embodiment, the middle layer 4 is about 4 to about 200 mils thick, while in another embodiment, the middle layer 4 is about 5 to 50 mils thick. In one exemplary embodiment, the middle layer 4 will be about 15 to about 30 mils thick.

The thermoplastic polymer of the middle layer may also comprise other thermoplastic polymers in addition to the carbonate polymer. Illustrative examples of other thermoplastic polymers suitable for use in the thermoplastic blend of the middle layer include a copolyester carbonate, a blend of polycarbonate and a copolyester carbonate or a blend with other polymers such as polyesters (polybutylene terephethalate (PBT), polyethylene terephthalate (PET), and the like), polyamides, acrylates-such as polymethyl methacrylate, polyethyl methacrylate polyphthalate carbonate (PPC), polycarbonate ester (PCE), polymers comprising resorcinol arylate polyester chain members such as described above, and the like, illustrative examples of PPC and PCE are tertiary copolymers of polycarbonate, bisphenol A isophthalate, and bisphenol A terephthalate having the formula:

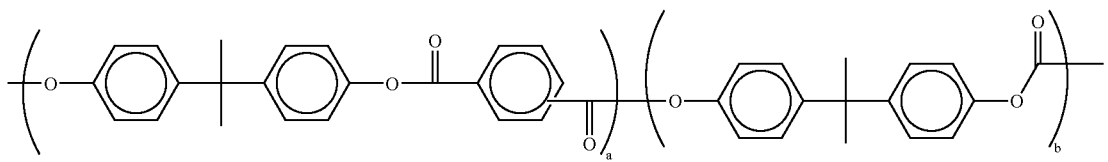

wherein a is an aromatic ester present in an amount of about 60 to about 80% by weight and b is a BPA carbonate present in an amount of about 20 to about 40% by weight, based on the total weight of the copolymer. In one embodiment, the thermoplastic polymer of the middle layer comprising a carbonate polymer will further comprise one or more of PPC, PCE, PBT, PET, or mixtures thereof in one especially exemplary embodiment, the thermoplastic polymer comprising a carbonate polymer will further comprise one or more of PPC, PCE, or mixtures thereof.

Such other thermoplastics may be present in an amount of from about 0 to about 50% by weight of the other thermoplastic, based on the total weight of the thermoplastic blend of the middle layer 4.

In one exemplary embodiment, the thermoplastic blend comprising the middle layer 4 will comprise PPC and a polycarbonate homopolymer prepared from bis-phenol-A and a carbonyl chloride precurser. In one exemplary embodiment, the PPC will be present in an amount of no less than or about equal to 5% by weight of PPC, based on the total weight of the thermoplastic blend of middle layer 4. In another embodiment, the PPC will be present in an amount of about 5 to about 40% by weight, based on the total weight of the thermoplastic blend of middle layer 4, while in one exemplary embodiment, the PPC will be present in an amount of about 20 to about 30% by weight, based on the total weight of the thermoplastic blend of middle layer 4.

In one embodiment, the polycarbonate or carbonate polymer will comprise aromatic polycarbonates and mixtures thereof Generally, aromatic polycarbonates possess recurring structural units of the formula (I):

wherein A is a divalent aromatic radical of the dihydroxy compound employed in the polymer reaction. Polycarbonate prepared by melt polymerization frequently contains Fries product. A Fries product is a product of a Fries reaction. The terms "Fries reaction" and "Fries rearrangement" are used interchangeably herein, and refer to the amount of side chain branching measured as branching points. The Fries rearrangement is an undesirable side reaction that occurs during the preparation of polycarbonate using the melt process. The resultant Fries product serves as a site for branching of the polycarbonate chains, which affects flow and other properties of the polycarbonate. Although low levels of Fries products may be tolerated in polycarbonates, the presence of high levels may negatively affect performance characteristics of the polycarbonate such as toughness and moldability. The amount of Fries product may be determined by measuring the branching points via methanolysis followed by high-pressure liquid chromatography (HPLC).

The reactants utilized in the production of a polycarbonate by a polycondensation reaction are generally a dihydroxy compound and a carbonic acid diester. There is no particular restriction on the type of dihydroxy compound that may be employed. For example, bisphenol compounds represented by the general formula (II) below may be used

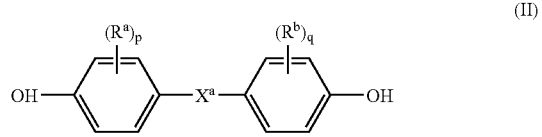

wherein $R^a$ and $R^b$ may be the same or different and wherein each represents a halogen atom or monovalent hydrocarbon group, and p and q are each independently integers from 0 to 4. Preferably, X represents one of the groups of formula (III):

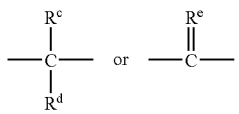
(III)

wherein $R^c$ and $R^d$ each independently represent a hydrogen atom or a monovalent linear or cyclic hydrocarbon group and $R^e$ is a divalent hydrocarbon group. Examples of the types of bisphenol compounds that may be represented by formula (II) include the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and the like; bis(hydroxyaryl)cycloalkane series such as, 1,1-bis(4-hydroxyphenyl)cyclopentane, 1,1-bis(4-hydroxyphenyl)cyclohexane, and the like; and the like, as well as combinations comprising at least one of the foregoing bisphenol compounds.

Other bisphenol compounds that may be represented by formula (II) include those wherein X is —O—, —S—, —SO— or —SO²—. Examples of such bisphenol compounds are bis(hydroxyaryl)ethers such as 4,4'-dihydroxy diphenyl ether, and the like; 4,4'-dihydroxy-3,3'-dimethylphenyl ether; bis(hydroxy diaryl)sulfides, such as 4,4'-dihydroxy diphenyl sulfide, 4,4'-dihydroxy-3,3'-dimethyl diphenyl sulfide, and the like; bis(hydroxy diaryl) sulfoxides, such as 4,4'-dihydroxy diphenyl sulfoxides, 4,4'-dihydroxy-3,3'-dimethyl diphenyl sulfoxides, and the like; bis(hydroxy diaryl)sulfones, such as, 4,4'-dihydroxy diphenyl sulfone, 4,4'-dihydroxy-3,3'-dimethyl diphenyl sulfone; and the like, as well as combinations comprising at least one of the foregoing bisphenol compounds.

Other bisphenol compounds that may be utilized in the polycondensation of the carbonate polymer are represented by the formula (IV):

(IV)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (IV), are resorcinol, substituted resorcinol compounds (such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, and the like), catechol, hydroquinone, substituted hydroquinones, (such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, and the like), and the like, as well as combinations comprising at least one of the foregoing bisphenol compounds.

Bisphenol compounds such as 3,3,3',3'-tetramethyl-1,1'-spirobi[indane]-6,6'-diol represented by the following formula (V) may also be used.

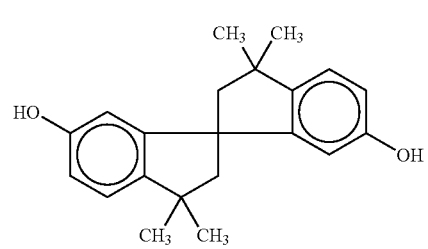
(V)

The preferred bisphenol compound is bisphenol A. In addition, copolymeric polycarbonates may be manufactured by reacting at least two or more bisphenol compounds with the carbonic acid diesters.

Examples of the carbonic acid diester that may be utilized to produce the polycarbonates are diphenyl carbonate, bis(2,4-dichlorophenyl)carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate.

The carbonic acid diester may contain a dicarboxylic acid and/or dicarboxylate ester. In general, it is desirable for the carbonic acid diester to contain an amount of less than or equal to about 50 mole percent (mole %), preferably less than or equal to about 30 mole% of either dicarboxylic acid or dicarboxylate ester. Examples of dicarboxylic acids or dicarboxylate esters that may be utilized are terephthalic acid, isophthalic acid, sebacic acid, decanedioic acid, dodecanedioic acid, diphenyl sebacic acid, diphenyl terephthalic acid, diphenyl isophthalic acid, diphenyl decanedioic acid, diphenyl dodecanedioic acid, and the like, as well as combinations comprising at least one of the foregoing. The carbonic acid diester may contain at least two kinds of dicarboxylic acids and/or dicarboxylate esters if desired.

An additional example of a suitable dicarboxylic acid or ester is an alicyclic dicarboxylic acid or ester. As used herein the terms "alicyclic" and "cycloaliphatic radical" have the same meaning and refer to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

Non-limiting examples of alicyclic dicarboxylic acids or esters comprise an acid or ester chosen from: cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, diphenyl 1,4-cyclohexanedicarboxylate, and a combination of at least two different alicyclic dicarboxylic acids or esters.

It is generally desirable for the molar ratio of the carbonic acid diester to the aromatic dihydroxy compound to be about 0.95 to about 1.20. Within this range it is generally desirable to have the molar ratio greater than or equal to about 1.01. Also desirable within this range is a molar ratio of less than or equal to about 1.10.

If desired, carbonate polymers or polycarbonates may be prepared by reacting a polyfunctional compound having at least three functional groups with the aromatic dihydroxy compound and carbonic acid diester. Suitable polyfunctional compounds include those having a phenolic hydroxy group or a carboxyl group. The preferred polyfunctional compound is a phenolic compound having three hydroxy groups. Examples of such polyfunctional compounds are 1,1,1-tris(4-hydroxyphenyl)ethane, 2,2',2"-tris(4-hydroxyphenyl)diisopropyl benzene, α-methyl-α,α', α'-tris(4-hydroxyphenyl)-1,4-diethyl benzene, α,α',α"-tris (4-hydroxyphenyl)-1,3,5-triisopropyl benzene, phloroglycine, 4,6-dimethyl-2,4,6-tri(4-hydroxyphenyl)-heptane-2,1,3,5-tri(4-hydroxyphenyl) benzene, 2,2-bis-[4,4-(4, 4'-dihydroxyphenyl)cyclohexyl]-propane,trimellitic acid, 1,3,5-benzene tricarboxylic acid, pyromellitic acid, and the like, as well as combinations comprising at least one of the foregoing polyfunctional compounds. The preferred polyfunctional compounds are 1,1,1-tris(4-hydroxyphenyl)ethane and α,α',α"-tris(4-hydroxyphenyl)-1,3,5-triisopropyl benzene, or combinations comprising at least one of the foregoing compounds.

Polyfunctional compounds may generally be used in amounts of less than or equal to about 0.03 moles per mole of aromatic dihydroxy compound. Within this range, it is desirable to use the polyfunctional compounds in amounts of greater than or equal to about 0.001 moles per mole of aromatic dihydroxy compound. Also desirable within this range, is an amount of polyfunctional compound of less than or equal to about 0.02 moles, preferably less than or equal to about 0.01 mole per mole of aromatic dihydroxy compound.

While not wishing to be bound to a particular theory, it is believed that carbonate polymers having a weight average molecular weight of from about 17,000 to about 22,000 are suitable for injection molding, while polycarbonate compositions having weight average molecular weight of at least about 20,000 to about 36,000 are suitable for extrusion processing of multi-layer laminates. In one exemplary embodiment, the carbonate polymer of the thermoplastic polymer of the middle layer 4 will have a weight average molecular weight in the range of about 30,000 to about 36,000.

In one embodiment, the middle layer 4 will comprise a LEXAN® polycarbonate, a commercially available carbonate polymer product of GE Plastics Corporation. In another embodiment, the middle layer 4 will comprise at least one of LEXAN® 100, ML9103, 131, or EXRL00065. In one exemplary embodiment, the middle layer 4 will comprise LEXAN® EXRL0065 polycarbonate.

Figure 6:
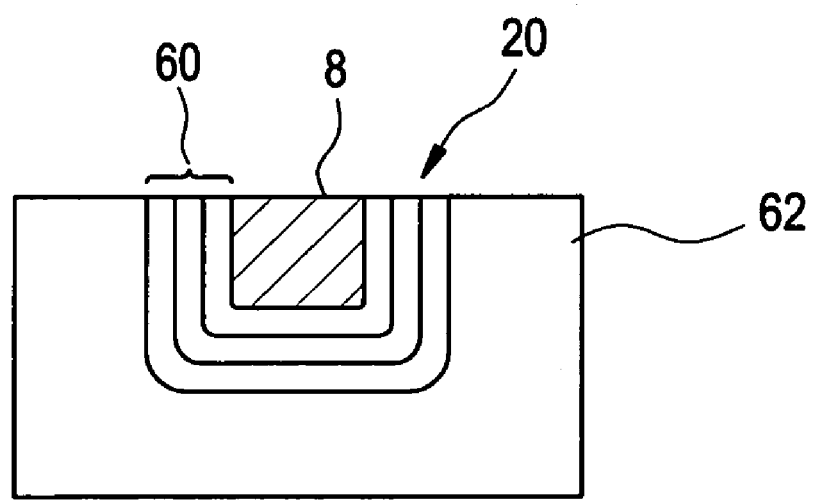
FIG. 6 is a cross sectional view of one embodiment of the method of making an article.

Turning again to FIG. 1, it can be seen that the inner tie-layer 6 is opposite to the outer layer 2 and is in contact with middle layer 4, such contact in one exemplary embodiment being contiguous. Inner tie-layer 6 provides desirable adhesion between the multi-layer laminate 10 and a substrate 8 as illustrated in FIG. 6.

In one embodiment, the tie-layer 6 comprises a thermoplastic blend comprising a carbonate polymer and an acrylonitrile-styrene graft copolymer that is at least one of an acrylonitrile-styrene-acrylate graft copolymer (ASA) or an acrylonitrile-butadiene-styrene graft copolymer (ABS).

In one embodiment, the melt flow volume of the tie-layer resin is between about 2 to about 50 $cm^3/10$ min, as measured at 260° C./5kg, per ISO 1133 or ASTM D1238, while in another exemplary embodiment, the melt flow volume will be about 3 to about 40 $cm^3/10$ min. In another exemplary embodiment, the melt flow volume of the tie-layer resin is between about 3 to about 30 $cm^3/10$ min, as measured at 260° C./5kg, per ISO 1133 or ASTM D1238.

Suitable carbonate polymer compositions include those discussed above as being suitable for the carbonate polymer of the middle layer 4. In one embodiment, suitable carbonate polymer compositions include those having a weight average molecular weight from about 20,000 to about 36,000, while in another embodiment, the carbonate polymer suitable for use in tie-layer 6 will have a weight average molecular weight of about 21,000 to about 31,000.

In another embodiment, suitable carbonate polymer compositions will have a melt flow viscosity (measured at 300 degrees C./1.2kg) of about 3 to about 30 cm3/10 min, while in another embodiment, the carbonate polymer compositions will have a melt flow viscosity of about 3 to about 26 cm3/1 min.

The carbonate polymer component of the thermoplastic blend of tie-layer 6 may also comprise a polybutylene terephthalate (PET), a copolyester carbonate, a polybutylene terephthalate (PBT), and the like, as discussed above with respect to the carbonate polymer of middle layer 4. In one exemplary embodiment, the carbonate polymer component of the thermoplastic blend of tie-layer 6 will comprise a polycarbonate homopolymer.

The thermoplastic composition of tie-layer 6 further comprises an acrylonitrile-styrene graft copolymer or interpolymer that is at least one of an acrylonitrile-styrene-acrylate graft copolymer (ASA) or an acrylonitrile-butadiene-styrene graft copolymer (ABS).

Acrylonitrile-butadiene-styrene (ABS) graft copolymers contain two or more polymeric parts of different compositions, which are bonded chemically. The graft copolymer is preferably prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and preferably two, are polymerized in the presence of the polymer backbone to obtain the graft copolymer. These resins are prepared by methods well known in the art.

For example, ABS may be made by one or more of emulsion or solution polymerization processes, bulk/mass, suspension and/or emulsion-suspension process routes. In addition, ABS materials may be produced by other process techniques such as batch, semi batch and continuous polymerization for reasons of either manufacturing economics or product performance or both.

The polymeric backbone is preferably a conjugated diene polymer such as polybutadiene, polyisoprene, or a copolymer, such as butadiene-styrene, butadiene-acrylonitrile, or the like.

The conjugated diene monomers normally utilized in preparing the polymeric backbone of the graft copolymer are described by the following formula (XIII):

(XIII)

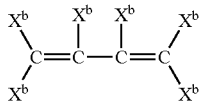

wherein $X^b$ is hydrogen, $C_1$-$C_5$ alkyl, chlorine, bromine, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing conjugated diene monomers, and the like. A preferred conjugated diene monomer is butadiene.

One monomer or group of monomers that may be polymerized in the presence of the polymeric backbone are monovinylaromatic hydrocarbons. The monovinylaromatic monomers utilized are described by the following formula (XIV):

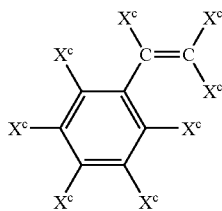

wherein $X^c$ is hydrogen, $C_1$-$C_{12}$ alkyl (including cycloalkyl), $C_6$-$C_{12}$ aryl, $C_7$-$C_2$ aralkyl, $C_7$-$C_{12}$ alkaryl, $C_1$-$C_{12}$ alkoxy, $C_6$-$C_{12}$ aryloxy, chlorine, bromine, or the like. Examples of the monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, mixtures comprising at least one of the foregoing compounds, and the like. The preferred monovinylaromatic monomers are styrene and/or alpha-methylstyrene.

A second group of monomers that may be polymerized in the presence of the polymeric backbone are acrylic monomers such as acrylonitrile, substituted acrylonitrile and/or acrylic acid esters, exemplified by acrylonitrile, and $C_1$-$C_7$ alkyl acrylates, such as methyl methacrylate, and the like.

The acrylonitrile, substituted acrylonitrile, or acrylic acid esters are described by the following formula (XV):

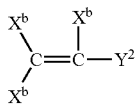

wherein $X^b$ is as previously defined and $Y^2$ is cyano, $C_1$-$C_{12}$ alkoxycarbonyl, or the like. Examples of such monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

In the preparation of the graft copolymer, the polymeric backbone comprises about 5 to about 60% by weight of the total graft copolymer composition. The monomers polymerized in the presence of the polymeric backbone, exemplified by styrene and acrylonitrile, comprise from about 40 to about 95% by weight of the total graft polymer.

The second group of grafting monomers, exemplified by acrylonitrile, ethyl acrylate or methyl methacrylate, of the graft polymer composition, preferably comprises about 5% to about 40% by weight of the total graft copolymer composition. The monovinylaromatic hydrocarbon exemplified by styrene preferably comprises about 10 to about 70% by weight of the total graft copolymer.

In preparing the graft copolymer, it is normal to have a certain percentage of the polymerizing monomers that are grafted on the polymeric backbone combine with each other and occur as free copolymer. If styrene is utilized as one of the grafting monomers and acrylonitrile as the second grafting monomer, a certain portion of the composition will copolymerize as free styrene-acrylonitrile copolymer (SAN). In the case where alpha-methylstyrene (or other monomer) is substituted for the styrene in the composition used in preparing the graft polymer, a certain percentage of the composition may be an alpha-methylstyrene-acrylonitrile copolymer. Also, there are occasions where a copolymer, such as alpha-methylstyrene-acrylonitrile, is added to the graft polymer copolymer blend. Thus, the graft copolymer may, optionally, comprise up to about 80% of free copolymer, based on the total weight of the graft copolymer. In one exemplary embodiment, the thermoplastic polymer of the inner tie layer 6 will comprise ABS graft copolymer and SAN copolymer.

Optionally, the polymeric backbone may be an acrylate rubber, such as the polymerization product of n-butyl acrylate, ethyl acrylate, 2-ethylhexyl acrylate, mixtures comprising at least one of the foregoing, and the like. Additionally, minor amounts of a diene may be copolymerized in the acrylate rubber backbone to yield improved grafting with the matrix polymer.

Styrene butadiene rubber or copolymers of butadiene rubbers with a glass transition temperature of less than 0° C. are especially suitable.

Acrylonitrile-butadiene-styrene graft copolymers are known in the art and many are commercially available, including, for example, the high-rubber acrylonitrile-butadiene-styrene resins available from General Electric Company as BLENDEX® grades 131, 336, 338, 360, and 415.

ABS polymers and resins having an average particle size of from about 0.1 microns to about 5 microns are especially suitable, with ABS having an average particle size of from about 0.1 microns to about 2 microns being used in one exemplary embodiment.

ABS polymers and resins having a cross-link density of from about 40 to about 90% are especially suitable, with ABS having a cross-link density of from about 45 to about 80% being used in one exemplary embodiment.

In one embodiment, the thermoplastic blend of the inner-tie layer 6 will comprise one or more ABS polymers or resins commercially available from GE Plastics under the trade name CYCOLOY®. In one exemplary embodiment, the ABS polymer will be one or more of CYCOLOY® C1000HF, C1200, MC8800, MC8002, EXCY0076 with CYCOLOY® grades C1000HF, EXCY0076 and MC8002 being used in particularly exemplary embodiments, and EXCY0076 being used in an especially exemplary embodiment.

ASA polymers are in general terpolymers of acrylate, styrene, and acrylonitrile and typically contain a grafted crosslinked alkylacrylate rubber phase. Most ASA products consist of a two-phase system of a grafted elastomeric terpolymer, acrylate-styrene-acrylonitrile, dispersed in a glassy continuous matrix of styrene-acrylonitrile (SAN) copolymer. The graft typically consists of a polyalkylacrylate rubber core and grafted SAN shell, small amounts of styrene and acrylonitrile being grafted onto the rubber particles to compatibilize the two phases.

ASA is typically made by a three-step polymerization reaction. First the elastomeric component, typically a polyalkyl acrylate rubber or polyalkyl alkylacrylate rubber, is produced in a water-based emulsion or in a solution polymerization process. In the second stage, the styrene and acrylonitrile are copolymerized optionally with other monomers and grafted onto the elastomeric phase to achieve the desired compatibility. This stage can be performed either in emulsion, bulk/mass or via suspension and/or the emulsion-suspension process route. In the third stage, styrene and acrylonitrile (and, optionally, other monomers) are copolymerized, either simultaneously with the second (grafting) stage or separately in an independent operation, to form the rigid matrix. Again, this step may involve one or more of the following processes: emulsion, bulk or suspension. In addition, the ASA materials may be produced by other process techniques such as batch, semibatch and continuous polymerization for reasons of either manufacturing economics or product performance or both.

In one embodiment, suitable ASA polymers are prepared from poly (alkyl acrylate) rubber based ASA graft phase in combination with a vinyl aromatic/vinyl cyanide/vinyl carboxylic acid ester matrix phase. In one exemplary embodiment, the ASA polymers are a two-phase system. The two-phase system comprises an acrylate rubber substrate, preferably poly (butyl acrylate) rubber, with a superstrate (or graft) copolymer of styrene-acrylonitrile (SAN) attached to it. This phase is commonly referred to as the "rubber graft phase" because the SAN is physically attached or grafted to the rubber through chemical reaction.

In one especially exemplary embodiment, a "rigid matrix phase" or continuous phase of MMASAN, a terpolymer of methyl methacrylate and styrene acrylonitrile, and PMMA, polymethylmethacrylate is utilized. The rubber graft phase (or dispersed phase) is dispersed throughout the matrix phase of PMMA/MMASAN that forms the polymer continuum The rubber interface is the surface forming the boundaries between the graft and matrix phases. The grafted SAN acts as a compatibilizer between the rubber and the matrix phase PMMA/MMASAN at this interface and prevents the separation of these two otherwise immiscible phases.

The ASA thermoplastic resins utilized by the present invention are graft copolymers of vinyl carboxylic acid ester monomers, vinyl aromatic monomers and vinyl cyanide monomers. ASA as used herein thus includes the group of polymers derived from vinyl carboxylic acid ester monomers, vinyl aromatic monomers and vinyl cyanide monomers as hereinafter defined. Vinyl carboxylic acid ester monomers (esters of alpha-, beta-unsaturated carboxylic acids) utilized in the present invention are herein defined by the following structural formula:

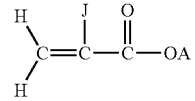

where J is selected from the group consisting of hydrogen, alkyl groups of from 1 to 8 carbon atoms, cycloalkyl, alkoxy and 1 hydroxyalkyl and A is selected from the group consisting of alkyl groups of from 1 to 12 carbon atoms. Examples of vinyl carboxylic acid ester monomers include butyl acrylate, methyl methacrylate, methyl acrylate, ethyl methacrylate, ethyl acrylate, butyl methacrylate, propyl methacrylate, propyl acrylate, hexyl methacrylate, 2-ethylhexyl acrylate, 2-ethylhexyl methacrylate, decyl methacrylate, methyl ethacrylate, butyl ethacrylate, cyclohexyl methacrylate, methoxyethyl acrylate, hydroxyethyl methacrylate and mixtures Thereof. The vinyl aromatic monomers are herein defined by the following structural formula:

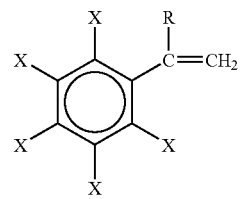

where each X is independently selected from the group consisting of hydrogen, alkyl groups of from 1 to 5 carbon atoms, cycloalkyl, aryl, alkaryl, aralkyl, alkoxy, aryloxy, hydroxy and halogen and where R is selected from the group consisting of hydrogen, alkyl groups of from 1 to 5 carbon atoms, bromine and chlorine. Examples substituted vinyl aromatic monomers include styrene, 4-methyl-styrene, vinyl styrene, trimethyl-styrene, 3,5-diethyl-styrene, p-tert-butyl- styrene, 4-n-propyl- styrene, α-methyl-styrene, α-ethyl-styrene, α-methyl-p-methyl- styrene, p-hydroxy-styrene, methoxy-styrenes, chloro-styrene, 2-methyl-4-chloro-styrene, bromo-styrene, α-chloro-styrene, α-bromo-styrene, dichloro-styrene, 2,6-dichloro-4-methyl-styrene, dibromo-styrene, tetrachloro-styrene and mixtures thereof Vinyl cyanide monomers are herein defined by the following structural formula:

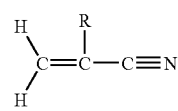

where R is selected from the group consisting of hydrogen, alkyl groups of from 1 to 5 carbon atoms, bromine and chlorine. Examples of vinyl cyanide monomers include acrylonitrile, methacrylonitrile, ethacrylonitrile, α-chloroacrylonitrile and α-bromoacrylonitrile.

Various monomers may be further utilized in addition to or in place of those listed above to further modify various properties of suitable ASA polymers and copolymers. Suitable ASA as discussed above may be compounded with a copolymerizable monomer or monomers. For example, the rubber phase may in addition to or in place of butyl acryl the rubber be comprised of polybutadiene, styrene-butadiene or butadiene-acrylonitrile copolymers, polyisoprene, EPM (ethylene/propylene rubbers), EPDM rubbers (ethylene/propylene/non- conjugated diene rubbers) and other crosslinked acrylate and alkylacrylate rubbers based on C1-C12 acrylates and alkylacrylates, either alone or as a mixture of two or more kinds. Furthermore, the rubber may comprise either a block or random copolymer. In addition to or in place of the acrylate, styrene and acrylonitrile monomers used in the graft or matrix resins, monomers including vinyl carboxylic acids such as acrylic acid, methacrylic acid and itaconic acid, acrylamides such as acrylamide, methacrylamide and n-butyl acrylamide, alpha-, beta-unsaturated dicarboxylic anhydrides such as maleic anhydride and itaconic anhydride, imides of alpha-, beta-unsaturated dicarboxylic acids such as maleimide, N-methylmaleimide, N-ethylmaleimide, N-alkyl maleimide, N-aryl maleimide and the halo substituted N-alkyl N-aryl maleimides, imidized polymethyl methacrylates (polyglutarimides), unsaturated ketones such as vinyl methyl ketone and methyl isopropenyl ketone, alpha-olefins such as ethylene and propylene, vinyl esters such as vinyl acetate and vinyl stearate, vinyl and vinylidene halides such as the vinyl and vinylidene chlorides and bromides, vinyl-substituted condensed aromatic ring structures such as vinyl naphthalene and vinyl anthracene and pyridine monomers may be used, either alone or as a mixture of two or more kinds.

In one embodiment, the rubbers are cross-linked poly (alkyl acrylate) rubbers and poly (alkyl alkylacrylate) rubbers. In other embodiments, the rubbers are poly (butyl acrylate), poly (ethyl acrylate) and poly (2-ethylhexyl acrylate) rubbers. In yet another embodiment, the rubber is poly (butyl acrylate) rubber, particularly poly (n-butyl acrylate) rubber.

In one embodiment, the monoethylenically unsaturated vinyl carboxylic acid ester monomer utilized for preparation of the rubber graft phase is selected from $(C_1-C_{12})$ alkyl acrylate and $(C_1-C_{12})$ alkyl, $(C_1-C_8)$ alkylacrylate monomers and mixtures thereof In another embodiment, it is selected from $(C_1-C_{12})$ alkyl acrylate monomers and mixtures thereof.

As used herein, the terminology "polyethylenically unsaturated" means having two or more sites of ethylenic unsaturation per molecule. A polyethylenically unsaturated monomer is used in suitable alkyl, acrylate rubbers to provide "cross linking" of the poly (alkyl acrylate) rubber particles formed in the process and to provide "graft linking" sites in the poly (alkyl acrylate) rubber for subsequent reaction with grafting monomers. In one embodiment, the polyethylenically unsaturated cross linking monomers contain at least two ethylenically unsaturated sites per molecule that have a reactivity that is similar, under the polymerization conditions utilized, to that of the monoethylenically unsaturated alkyl acrylate monomer. In another embodiment, the graft linking monomers include those monomers having at least one site of ethylenic unsaturation that have a reactivity that is similar, under the emulsion or other polymerization conditions used, to that of the alkyl acrylate monomer and at least one other site of ethylenic unsaturation having a reactivity that is substantially different, under the emulsion polymerization conditions used in the process of the present invention, from that of the monoethylenically unsaturated alkyl acrylate monomer, so that at least one unsaturated site per molecule of graft linking monomer reacts during synthesis of the rubber latex and at least one other unsaturated site per molecule of graft linking monomer remains unreacted following synthesis of the rubber latex and is thus remains available for subsequent reaction under different reaction conditions.

In yet another embodiment, the polyethylenically unsaturated monomers include, for example, butylene diacrylate, divinyl benzene, butene diol dimethacrylate, trimethylolpropane tri(meth)acrylate, allyl methacrylate, diallyl maleate, triallyl cyanurate and mixtures thereof In a preferred embodiment, triallyl cyanurate is used as both a cross linking monomer and a graft linking monomer.

Minor amounts, such as, for example, up to about 25 pbw per 100 pbw of the total amount of monomers, of other unsaturated monomers that are copolymerizable with the alkyl acrylate monomer used in the present invention may optionally be included in the reaction mixture. Suitable copolymerizable monomers include, for example, monoethylenically unsaturated carboxylic acids, hydroxy $(C_1-C_{12})$ alkyl methacrylate monomers, $(C_4-C_{12})$ cycloalkyl (meth)acrylate monomers, acrylamide monomers, maleimide monomers and vinyl esters. As used herein, the term "$(C_4-C_{12}$ or $C_4-C_{12})$ cycloalkyl" means a cyclic alkyl substituent group having from 4 to 12 carbon atoms per group and the term "acrylamide" refers collectively to acrylamides and methacrylamides. Also suitable are vinyl aromatic monomers such as, for example, styrene and substituted styrenes having one or more alkyl, alkoxy, hydroxy or halo substituent group attached to the aromatic ring.

In one embodiment, the ASA polymers comprise about 10 percent to about 40 percent of poly (butyl acrylate) rubber. In a second embodiment, about 15 percent to about 30 percent. In yet a third embodiment, about 15 percent and 25 percent rubber.

In one embodiment, the rubber graft phase comprises of 20% poly (butyl acrylate) to about 70% poly (butyl acrylate). In another embodiment, the rubber graft phase will comprise about 45% poly (butyl acrylate) rubber and 55% SAN, with the SAN portion of the graft phase made from 65% styrene and 35% acrylonitrile to 75% styrene and 25% acrylonitrile. In yet another embodiment, the SAN portion will comprise from about 70-75% styrene and about 25-30% acrylonitrile.

In one embodiment, the MMASAN comprises 80% MMA, 15% styrene and 5% acrylonitrile and in another embodiment, about 60% MMA, 30% styrene and 10% acrylonitrile. In a third embodiment, the MMASAN comprises about 45% methyl methacrylate, 40% styrene and 15% acrylonitrile. In one embodiment, the PMMA/MMASAN ratio in the matrix phase copolymer ranges from about 20/80 to about 80/20; and in another embodiment, from 25/75 to about 75/25 including 50/50.

The ASA polymer in one embodiment comprises a ratio of graft phase to matrix phase of 15/85 to 75/25, and in another embodiment, about 45% graft phase and 55% matrix phase. The graft copolymer phase may be coagulated, blended and colloided with the matrix phase homopolymers, copolymers and/or terpolymers by the various blending processes that are well known in the art to form the ASA polymer blend.

In one exemplary embodiment, the thermoplastic blend of the inner tie-layer 6 will be a commercially available thermoplastic composition comprising a carbonate polymer, an ASA graft copolymer and an SAN copolymer. Suitable commercially available thermoplastic compositions are the GELOY™ brand thermoplastic composition available from General Electric Plastics of Washington, W. Va. In one embodiment, the inner tie-layer 6 will be at least one of GELOY™ HRA 150, HRA 170, XP7550, and mixtures thereof. In one particularly exemplary embodiment, the tie layer 6 will comprise GELOY™ HRA 150.

Suitable SAN will generally have a weight average molecular weight from about 60,000 to about 200,000, and in one exemplary embodiment, from about 90,000 to about 190,000. SAN copolymers having a acrylonitrile (AN) content of from about 15 to 40 weight %, based on the weight of the SAN copolymer, are particularly suitable, with SAN copolymers having from about 20 to about 35 weight % being used in one exemplary embodiment.

In one embodiment, the thermoplastic polymer of tie-layer 6 will comprise about 25% to about 80% by weight of the polycarbonate, about 10 to about 35% by weight of the ASA or ABS and about 10 to about 40% by weight of SAN based on the total weight of the tie-layer. In another embodiment, the thermoplastic polymer of tie-layer 6 will comprise about 40% to about 80% by weight of the polycarbonate, about 10% to about 30% by weight of the ASA or ABS and about 10% to about 30% by weight of SAN, based on the total weight of the tie-layer. In one exemplary embodiment, the thermoplastic polymer of tie-layer 6 will comprise about 40% to about 75% by weight of the polycarbonate, about 12% to about 30% by weight of the ASA or ABS and about 12% to about 30% by weight of SAN, based on the total weight of the tie-layer.

The thermoplastic polymer of the inner tie layer can optionally comprise other components such as art-recognized additives including, but not limited to, stabilizers, color stabilizers, heat stabilizers, light stabilizers, UV screeners, UV absorbers, flame retardants, anti-drip agents, flow aids, plasticizers, ester interchange inhibitors, antistatic agents, mold release agents, fillers, and colorants such as metal flakes, glass flakes and beads, ceramic particles, other polymer particles, dyes and pigments which may be organic, inorganic or organometallic.

In one exemplary embodiment, the thermoplastic polymer of the inner-tie layer will comprise a stabilizer or stabilizer system. In one desirable embodiment, the stabilizer will comprise an alkylthioester. In one particularly exemplary embodiment, the stabilizer will comprise a pentaerythritol tetrakis (beta-laurylthioproprionate) containing stabilizer. In another alternative embodiment, the stabilizer will comprise a pentaerythritol tetrakis(dodecylthioproprionate) containing stabilizer. An illustrative, commercially available example of a suitable alkylthioester based or containing stabilizer is SEENOX(™) stabilizer, commercially available from Shipro Kasei Kashi Ltd.

In one especially exemplary embodiment, the inner tie-layer 6 will comprise a thermoplastic polymer comprising a polycarbonate polymer, an ABS graft copolymer, an SAN copolymer and the SEENOX stabilizer. Such thermoplastic polymer blends are available from GE Plastics as CYCOLOY® EXCY0076.

The exact thickness of the tie-layer 6 will be determined by the desired application In one embodiment, the tie-layer 6 is typically about 3 to about 30 mils thick, while in another embodiment, the thickness of inner tie-layer 6 will be about 3 to 12 mils thick. In one exemplary embodiment, the tie-layer 6 is about 3 to about 6 mil thick, while in another embodiment, the thickness will be about 9 to about 12 mils thick.

Generally, the total thickness of the multi-layer laminate is about 20 to about 200 mils. In one exemplary embodiment, the multi-layer laminate 10 is about 30 to about 55 mils thick.

The multi-layer laminate may be made by any one of a variety of manufacturing methods including but not limited to co-injecting molding, co-extrusion lamination, co-extrusion blow film molding, co-extrusion, overmolding, multi-shot injection molding, sheet molding, and the like. In one embodiment, the multi-layer laminate may be made by co-extrusion lamination. In another embodiment, the outer layer 2 may be laminated on a separately, from a prior extruded film put on a roll. In such an embodiment, the outer layer 2 may comprise at least one sub-layer that comprises an adhesive or adherent composition.

In one embodiment, the multi-layer laminate 10 is prepared by co-extrusion lamination wherein the layers are simultaneously extruded through a sheet or film die orifice that may be of a single manifold or multi-manifold design. While still in the molten state, the layers are laminated together and then compressed together by being passed through the nip of a pair of rolls that may be heated. The laminate is then cooled. The thickness of the multi-layer laminate 10 is determined by the desired application.

In another embodiment, the multi-layer laminate 10 is formed by co-extrusion wherein the individual molten layers 2, 4, and 6 are injected together and extruded through a die orifice thereby extruding a multi-layer sheet or film and then cooled.

Yet another embodiment, a process to form the multi-layer laminate 10 involves the co-extrusion blow film process wherein multi-layers are extruded to form a tubular parison that is then blow molded into a hollow article that is subsequently slit to prepare a flat multi-layer laminate 10.

Figure 3:
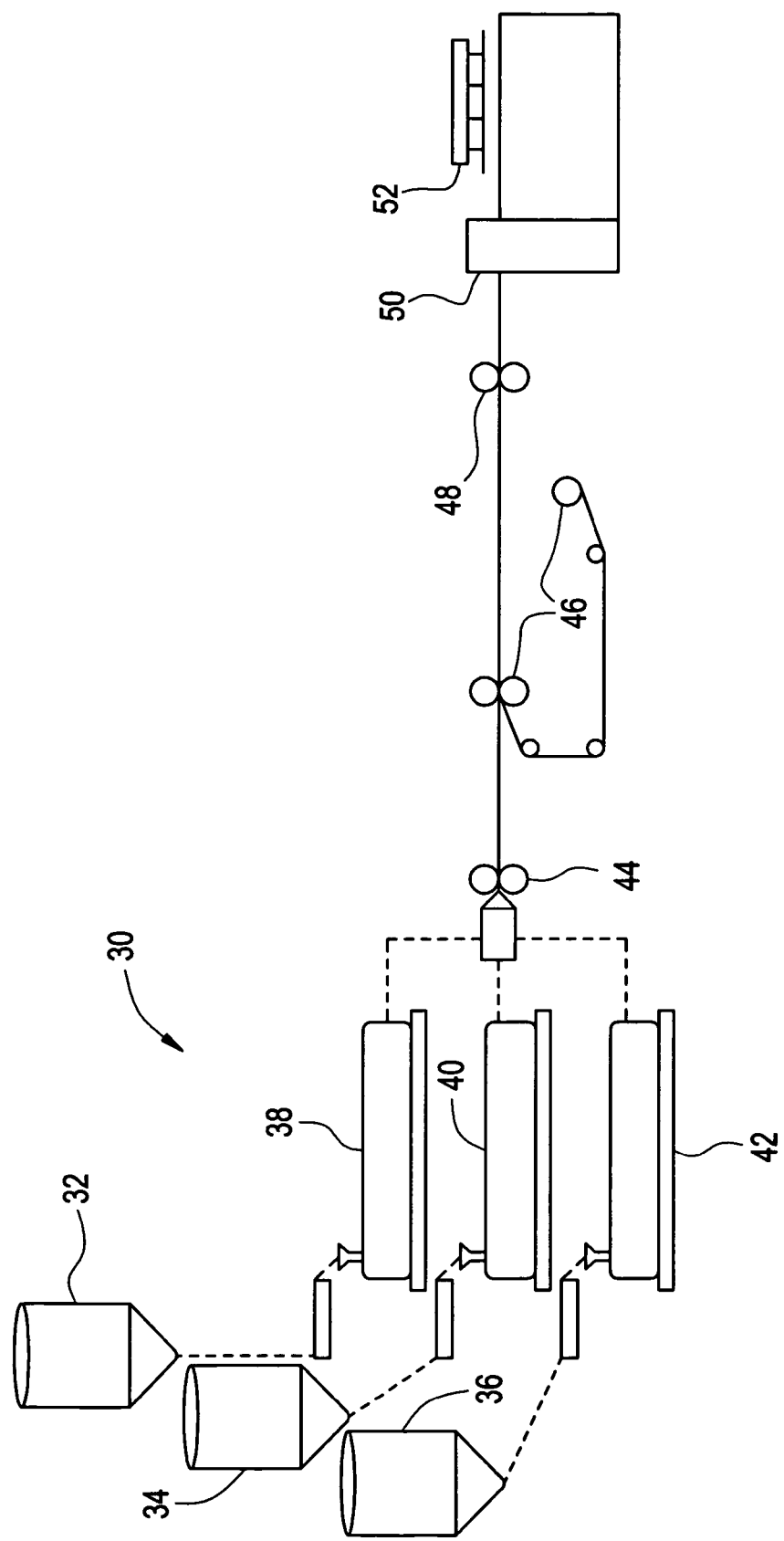
FIG. 3 is a schematic view of one embodiment of a co-extrusion mechanism for forming the multi-layer laminate of the present disclosure.

In one exemplary embodiment, the multi-layer laminate will be made by co-extrusion. As shown in FIG. 3, a schematic view of an extrusion mechanism designated by reference numeral 30, the multi-layer laminate 10 may be formed by co-extrusion lamination of the layers 2, 4, and 6, respectively from hoppers/extruders 32/38, 34/40, and 36/42. The extruder 30 comprises a first hopper 32, a second hopper 34, and a third hopper 36 for the transfer of material to a corresponding first extruder 38, second extruder 40, and third extruder 42, respectively. In this manner, each hopper and each extruder may be adapted to process compositions of differing extrusion temperatures and viscosities. Each extruder transfers molten material to a roll stack 44 for compression of the separate compositions into the multi-layer laminate 10. The multi-layer laminate 10 may be further processed onto rolls by a masking roll 46, or pulled into sheets by a pull roll 48. The sheets of multi-layer laminate 10 may be cut into sheets of smaller dimension at a shear station 50 and placed in a sheet stacker 55.

The extrusion mechanism 30 processes the layers 2, 4, and 6 having differing process temperatures into the multi-layer laminate 10. In one exemplary example, the first extruder 38 operates to process the resorcinol arylate polyester outer layer 2 at a temperature of about 400 to about 550° F., preferably from about 400 to about 500° F., and more preferably about 440 to about 480° F. The second extruder 40 operates to process the thermoplastic polymer comprising a polycarbonate composition of middle layer 4 at a temperature of about 400 to about 550° F., preferably about 420 to about 530° F., and more preferably from 430 to about 530° F. A third extruder 42 operates to process the inner tie-layer at a temperature of about 400° F. to about 530° F., preferably from about 420 to about 500° F., and more preferably from about 440 to about 480° F.

The layers 2, 4, and 6 as such are compressed into suitable form as a multi-layer laminate 10.

Figure 4:
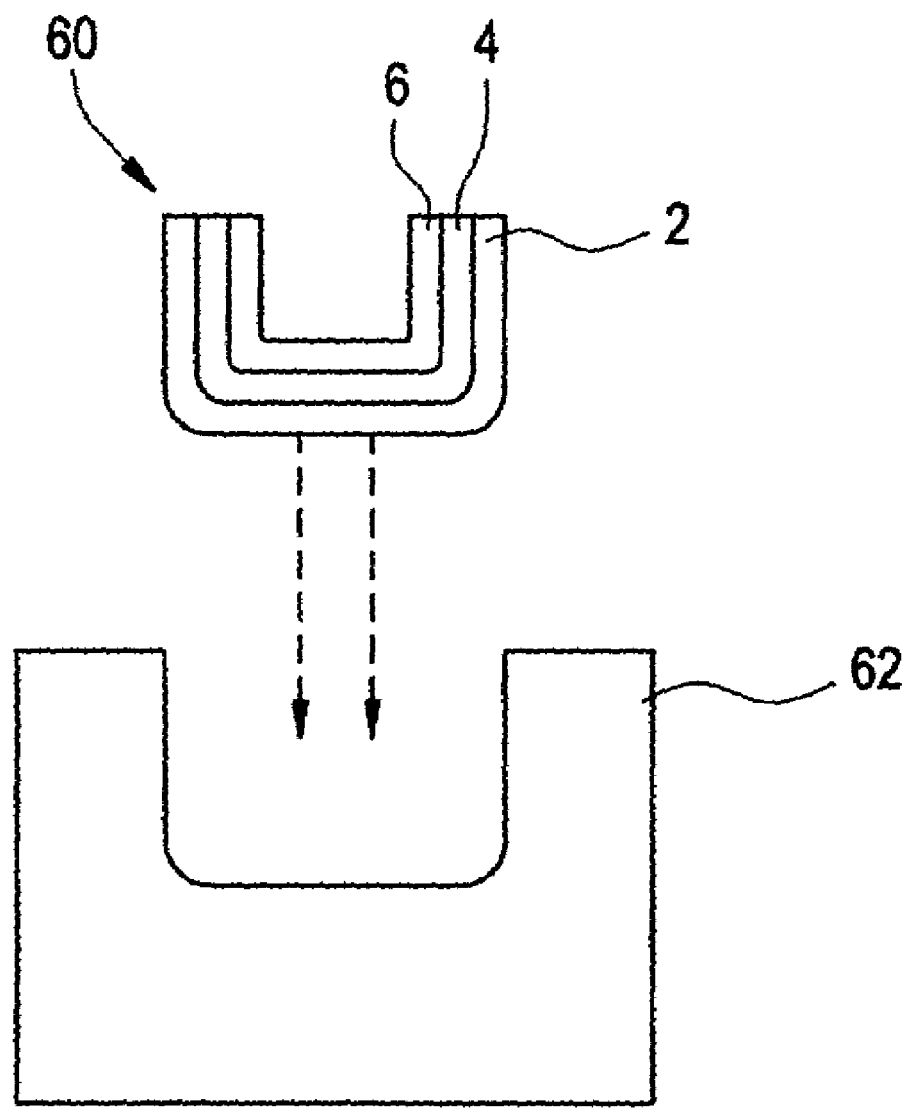
FIG. 4 is a cross sectional view of one embodiment of the method of making an article.

In one exemplary embodiment, the thermoformable multi-layer laminate 10 may be made into a formed multi-layer laminate 60 having any desired configuration as illustrated in FIG. 4. It will be appreciated that the cross-sectional view of a formed multi-layer laminate is identical to that of the multi-layer laminate 10 of FIG. 1. However, the shape of the formed multi-layer laminate 60 may have a configuration corresponding to a substrate 8 or a mold 62 as illustrated in FIG. 4. The multi-layer laminate 10 may be formed into a formed multi-layer laminate 60 by any one of a variety of methods, including but not limited to, thermoforming, compression forming, vacuum forming and the like.

Figure 2:
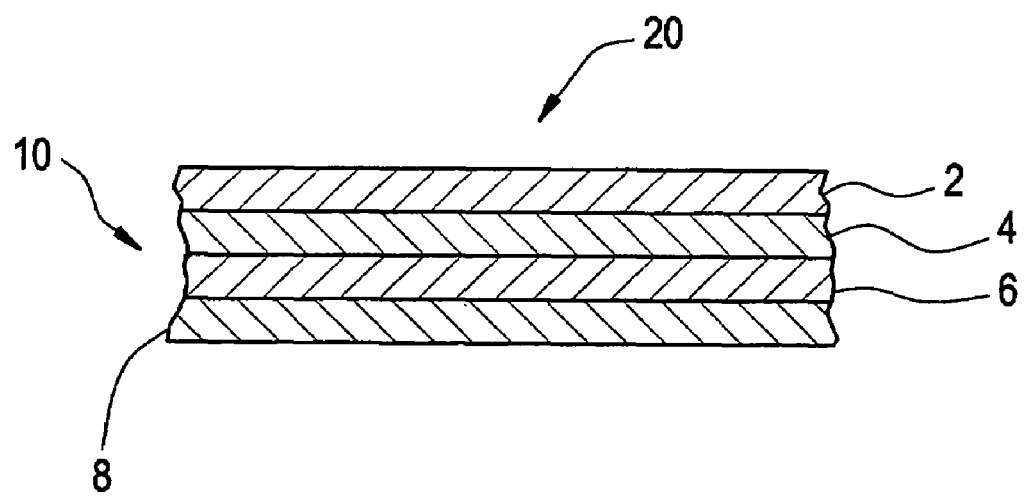
FIG. 2 is a cross-sectional view of one embodiment of a formed article comprising a multi-layer laminate of FIG. 1 bonded to a substrate.

Turning now to FIG. 2, a sectional view of a formed article 20 can be seen. Formed article 20 comprises a multi-layer laminate 10 adhered or bonded to a substrate 8. Inner tie-layer 6 is adhered to the substrate 8 while simultaneously providing good adhesion to the middle layer 4 of multi-layer laminate 10.

The substrate 8 employed may be any of a variety of suitable compositions including but not limited to thermoset materials, thermoplastic materials, foamed materials, reinforced materials, and combinations thereof Illustrative examples include polyurethane compositions including polyurethane foam and fiber reinforced polyurethane, polypropylene including fiber-reinforced polypropylene, polycarbonate/PBT blends and the like. Reinforcing fibers include carbon fibers, glass and the like.

In one embodiment, the substrate 8 will be at least one of reinforced thermoplastic polyurethane, foamed thermoplastic polyurethane, and combinations thereof In one exemplary embodiment, the substrate 8 will be at least one of glass fiber-reinforced polyurethane, carbon fiber-reinforced polyurethane, foamed thermoplastic polyurethane, and combinations thereof The bonding of inner tie-layer 6 to substrate 8 may result from molding, adhesives, chemical bonding, mechanical bonding, and the like, as well as combinations thereof In one exemplary embodiment, the bonding of the inner tie-layer 6 to substrate 8 will result from the injection molding of a substrate 8 directly onto the inner tie-layer 6.

Figure 5:
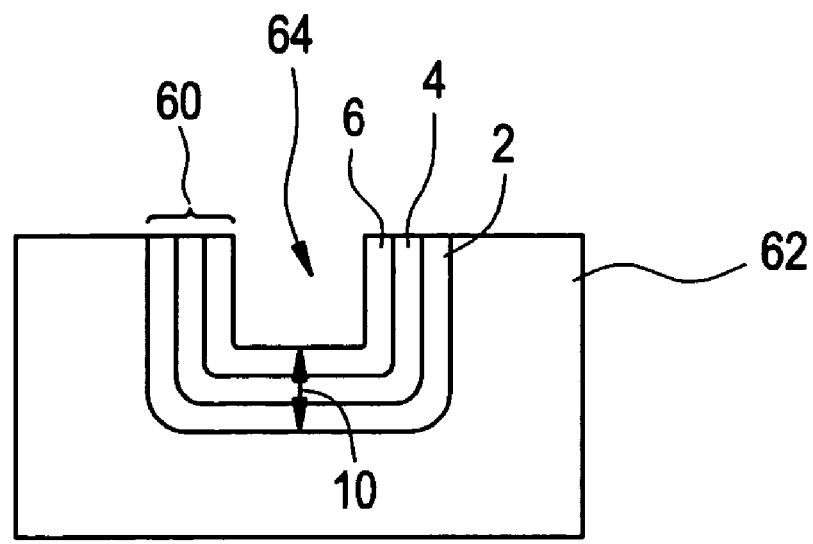
FIG. 5 is a cross sectional view of one embodiment of the method of making an article.

Also disclosed is a formed method for making a formed article as illustrated in FIGS. 5 and 6. The disclosed method comprises providing the disclosed multi-layer laminate 10; placing the multi-layer laminate 10 into a mold 62 so that a cavity 64 is formed behind or in back of tie-layer 6 of the multi-layer laminate 10, and placing a substrate 8 into the cavity 64 behind the multi-layer laminate 10 wherein the inner-tie layer 6 of the multi-layer laminate 10 bonds or is adhered to the substrate 8 to provide a formed article 20.

In one embodiment as shown in FIGS. 5 and 6, the multi-layer laminate 10 placed into the mold 62 may be a formed multi-layer laminate 60. In one embodiment, the formed multi-layer laminate 60 may have a shape that substantially conforms to the mold 62.

The disclosed method may further comprise cooling the formed article and/or removing the formed article 20 from the mold 62. In one embodiment, the formed article 20 is cooled and subsequently removed from the mold.

The placing of the substrate 8 into the cavity 64 may be done in a variety of ways, including injection molding, reaction injection molding, long fiber reinforced injection molding, and the like. In one embodiment, the substrate 8 is injected into the cavity 64 by reaction injection molding. In one embodiment, the substrate 8 is injected as a liquid and is then molded to form a semi- solid or solid substrate 8.

The molded article 20 is especially applicable for automotive parts including but not limited to exterior automotive panels such as door panels, roofs, hood panels, and the like.

The following examples will illustrate embodiments of the present disclosure and methods of manufacturing.

EXAMPLES

Examples 1

Four multi-layer laminates having different tie-layer compositions having a thermoplastic blend comprising ASA/SAN were prepared. Each laminate was made of an outer layer of an iso terephthalic resorcinol/bisphenol A copolymer, commercially available from GE Plastics as ITR-#RL7577, a middle layer of a polycarbonate homopolymer prepared from bis-phenol-A and a carbonyl chloride, commercially available as LEXAN® 131 (Samples 1 & 2), LEXAN®100 (Sample 3), and an inner tie-layer consisting of a blend of polycarbonate (PC), acrylonitrile-styrene- acrylate graft copolymer (ASA) and styrene-acrylonitrile copolymer (SAN) of varying proportions as set forth in Table 1. The average thickness of the outer layer was from 5 to 15 mils, the average thickness of the middle layer was from 15 to 40 mils, and the average thickness of the inner layer was from 4 to 15 mils. The total thickness of the laminates was from 30 to 55 mils.

TABLE 1

Tie Layer Blends & Adhesion

| Sample | PC (%) | ASA/SAN (%) | (0: no adhesion/ 2: acceptable adhesion) |
| --- | --- | --- | --- |
| 1 | 72 | 28 | 1 |
| 2 | 60 | 40 | 2 |
| 3 | 60 | 40 | 2 |
| 4 | 27 | 78 | 0-1 |

The laminates were prepared via three different co-extrusion lines.

Samples 1 and 2 were run on extrusion line A having a single manifold die with a width of 30" and a line speed of 10.75ft/min. A chrome roll (240° F.) was in contact with the outer layer and a silicon rubber roll (130° F.) with the inner layer. The inner layer composition was extruded using a 1 ¼" diameter single-stage screw extruder. The middle layer composition was extruded using a 2 ½" diameter extruder, equipped with a two-stage barrier screw with a middle mixing section. The outer layer was extruded using a 2" diameter single stage screw extruder.

Sample 3 was run on extrusion line B having a 54" wide single manifold die having a line speed of from 6.2 to 8.1 ft/min. A chrome roll (240° F.) was in contact with the outer layer and a chrome roll (200° F.) with the inner layer. The inner layer composition was extruded using a 2" diameter single stage screw extruder. The middle layer composition was extruded using a 3 ½" diameter extruder, equipped with a two-stage barrier screw with vacuum stripping. The outer layer was extruded using a 2 ½" diameter single stage screw extruder.

Sample 4 was run on extrusion line C having a single manifold die with a width of 14" and a line speed of about 4 to 6 ft/min. A chrome roll (240° F.) was in contact with the outer layer and a silicon rubber roll (130° F.) with the inner layer. The inner layer composition was extruded using a 1" diameter single-stage screw extruder. The middle layer composition was extruded using a 1 ½" diameter extruder. The outer layer was extruded using a 1" diameter single stage screw extruder.

The laminates were adhered to thermoplastic polyurethane foam substrates applied via long fiber reinforced injection molding (LFI).

Adhesion was measured using tensile strength instrument determined visually with the observed results reported above in Table 1. As shown above, the tie layer of this invention generally exhibits acceptable to good adhesion between the tie-layer and the substrate.

A peel test was also run on samples 2 and 3 using a 90° peel test. The average results in pounds per inch (lbs/in) are as follows: mean peel strength (lb/in) 6.5, standard deviation 2.5. This demonstrates numerically the adhesion strength and adhesion capability of the disclosed tie-layer.

Example 2

Multi-layer laminates similar to those produced in Example 1 but having ABS instead of ASA were produced. Each laminate was made of an outer layer of an iso terephthalic resorcinol/bisphenol A copolymer, commercially available from GE Plastics as ITR-#RL7577, a middle layer of a polycarbonate homopolymer prepared from bis-phenol-A and a carbonyl chloride, commercially available as LEXAN® EXRL0065, and an inner tie-layer consisting of a blend of polycarbonate (PC), acrylonitrile-butadiene-styrene graft copolymer (ABS) and styrene-acrylonitrile copolymer (SAN) of varying proportions as set forth in Table 2. The average thickness of the outer layer was from 5 to 15 mils, the average thickness of the middle layer was from 15 to 40 mils, and the average thickness of the inner layer was from 4 to 15 mils. The total thickness of the laminates was from 30 to 55 mils.

TABLE 2

Tie Layer Blends & Adhesion

| Sample | PC (%) | ABS/SAN (%) | Peel Test Average/Std dev |
|---|---|---|---|
| 1 | 51 | 19/30 | 21.1/5 |
| 2 | 73 | 14/13 | 14.5/4.3 |
| 3 | 82 | 8/10 | 4.5/0.4 |
| 4 | 65 | 19/16 | 13.4/1.2 |

The laminates were formed on extrusion line C having a single manifold die with a width of 14" and a line speed of about 4 to 6 ft/min. A chrome roll (240° F.) was in contact with the outer layer and a chrome roll (130° F.) with the inner layer. The inner layer composition was extruded using a 1" diameter single-stage screw extruder. The middle composition was extruded using a 1 ½" diameter extruder. The outer layer was extruded using a 1" diameter single stage screw extruder.

A peel Test was run as per Example 1, with the results reported above in Table 2.

The laminate of sample 4 was adhered to a thermoplastic polyurethane foam substrate applied via long fiber reinforced injection molding (LFI). The adhesion of the LFI-PU foam was measured as per Example 1 with a result of about 13.0.

Example 3

A multi-layer laminate was made according to sample 4 of Example 2, except that about 0.3% by weight of the SEENOX stabilizer was added to the inner tie-layer composition. Peel strength was evaluated as per Examples 1 and 2. The initiation peel strength of the inner tie-layer to the middle layer was about 32, while the propagation peel strength was about 13 lb/in to about 14 lb/in. After LFI-PU foam was applied as per Examples 1 and 2, the peel strength of the inner tie-layer to the foam was evaluated. The initiation peel strength was about 25 lb/in, while the trength was about 16 lb/in.

The multi-layer laminates allow for the production of formed articles having the surface quality and appearance necessary for exterior automotive parts while simultaneously providing improved adhesion to a substrate. Finally, the multi-layer laminates are advantageous in that they can be manufactured by co-extrusion.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A formable thermoplastic multi-layer laminate comprising
   an outer layer comprising a polymer comprising resorcinol arylate polyester chain members,
   a middle layer comprising a thermoplastic polymer, and
   an inner-tie layer comprising a thermoplastic polymer comprising a carbonate polymer and an acrylonitrile-styrene graft copolymer comprising at least one of an acrylonitrile-styrene-acrylate graft copolymer (ASA) or an acrylonitrile-butadiene-styrene graft copolymer (ABS),
   the middle layer being between the outer layer and the inner-tie layer and being in contact with both the outer layer and the inner-tie layer.

2. The multi-layer laminate of claim 1 wherein the outer layer has a thickness about 3 to about 30 mils.

3. The multi-layer laminate of claim 1 wherein the acrylonitrile-styrene graft copolymer comprises an acrylonitrile-styrene-acrylate graft copolymer (ASA).

4. An article comprising
   a formable thermoplastic multi-layer laminate comprising
   an outer layer comprising a polymer comprising resorcinol arylate polyester chain members,
   a middle layer comprising a thermoplastic polymer,
   an inner-tie layer comprising a thermoplastic polymer comprising a carbonate polymer and an acrylonitrile-styrene graft copolymer comprising at least one of an acrylonitrile-styrene-acrylate graft copolymer (ASA) or an acrylonitrile-butadiene-styrene graft copolymer (ABS),
   the middle layer being juxtaposed between the outer layer and the inner-tie layer and being in continuous contact with both the outer layer and the inner-tie layer, and
   a substrate bonded to the inner-tie layer.

* * * * *